United States Patent
Ueda et al.

(10) Patent No.: US 7,027,373 B2
(45) Date of Patent: *Apr. 11, 2006

(54) INFORMATION RECORDING MEDIUM, INFORMATION RECORDING METHOD AND INFORMATION REPRODUCTION METHOD

(75) Inventors: Hiroshi Ueda, Osaka (JP); Motoshi Ito, Osaka (JP); Kenji Takauchi, Osaka (JP); Yoshihisa Fukushima, Osaka (JP); Shinji Sasaki, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 73 days.

This patent is subject to a terminal disclaimer.

(21) Appl. No.: 10/805,978

(22) Filed: Mar. 22, 2004

(65) Prior Publication Data

US 2004/0174785 A1 Sep. 9, 2004

Related U.S. Application Data

(63) Continuation of application No. 09/800,440, filed on Mar. 6, 2001.

(30) Foreign Application Priority Data

Mar. 8, 2000 (JP) .............................. 2000-062841

(51) Int. Cl.
*G11B 7/00* (2006.01)
(52) U.S. Cl. ................................. 369/53.15; 369/53.17
(58) Field of Classification Search ............. 369/275.3, 369/53.1, 53.12, 53.15, 53.17, 53.21
See application file for complete search history.

(56) References Cited

U.S. PATENT DOCUMENTS

| 5,818,654 A | 10/1998 | Reddy et al. ................. 360/53 |
| 6,189,118 B1 | 2/2001 | Sasaki et al. ............ 369/53.14 |

FOREIGN PATENT DOCUMENTS

| EP | 0 789 361 A3 | 8/1997 |
| EP | 0 866 456 A1 | 9/1998 |
| EP | 0 952 573 A2 | 10/1999 |
| EP | 0 969 463 A1 | 1/2000 |
| JP | 11-297005 | 10/1999 |

OTHER PUBLICATIONS

European Search Report, Application No. EP 01 10 5672, dated Jul. 10, 2001.
European Search Report, Application No. EP 01 10 5672, dated Oct. 18, 2001.

*Primary Examiner*—Nabil Hindi
(74) *Attorney, Agent, or Firm*—Renner, Otto, Boisselle & Sklar, LLP

(57) ABSTRACT

An information recording medium comprises a user area, and a spare area including a replacement area, wherein the replacement area may be used instead of a defective area in the user area. The user area and the spare area include a plurality of sectors. Each of the plurality of sectors includes a user data area for recording user data, and an attribute data area for recording defect replacement allowance attribute data. The defect replacement allowance attribute data indicates whether recording of the user data has been executed in a state that the execution of a defect replacement process is allowed. In the defect replacement process, the defective area in the user area is replaced with the replacement area in the spare area.

1 Claim, 14 Drawing Sheets

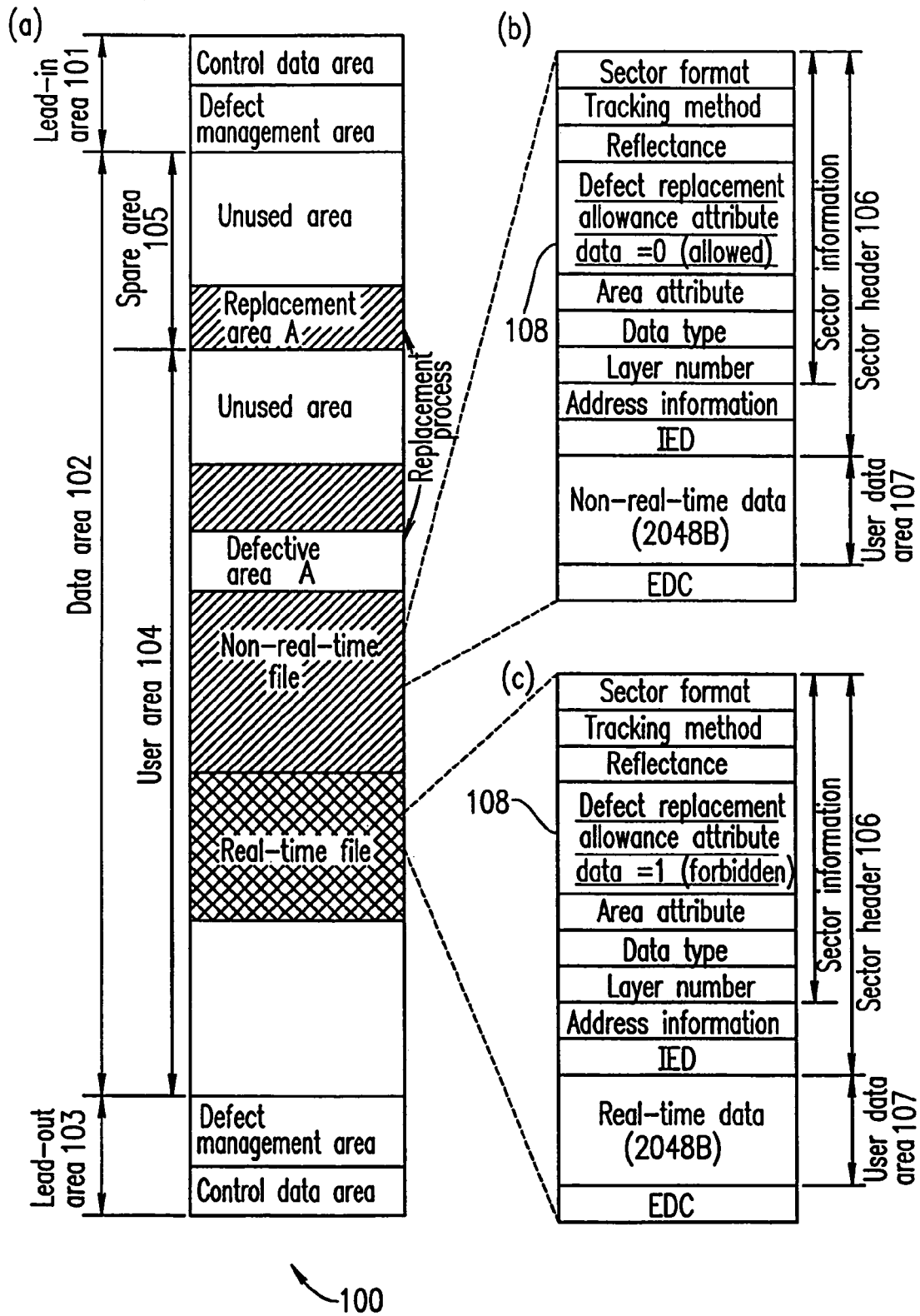

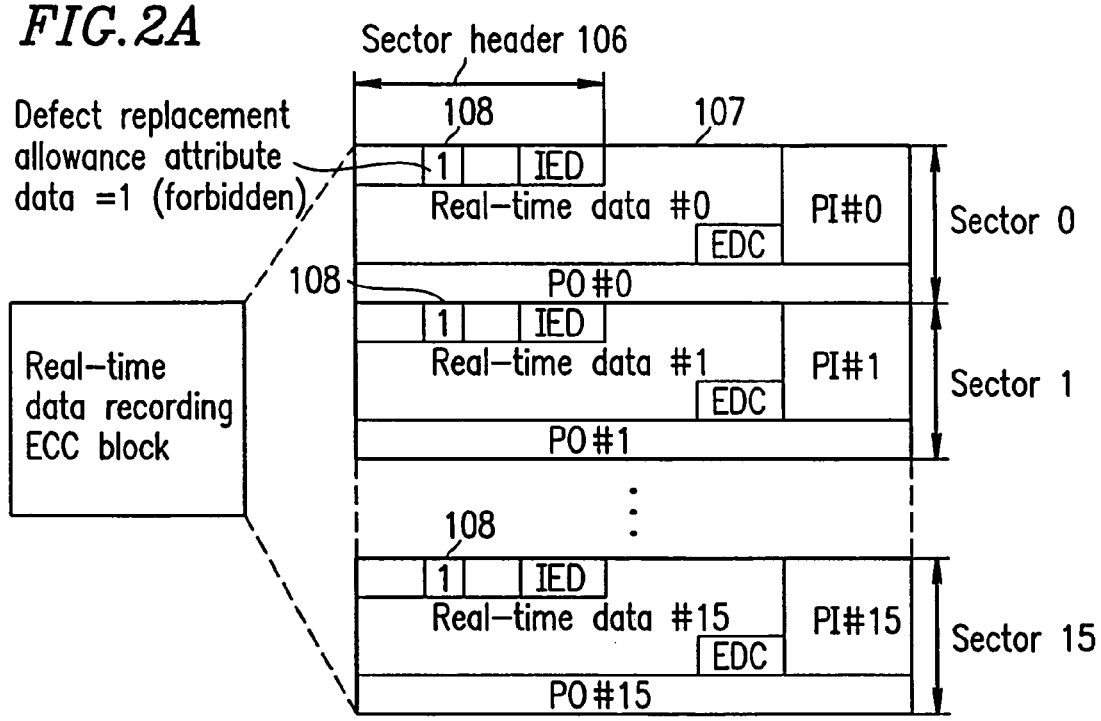
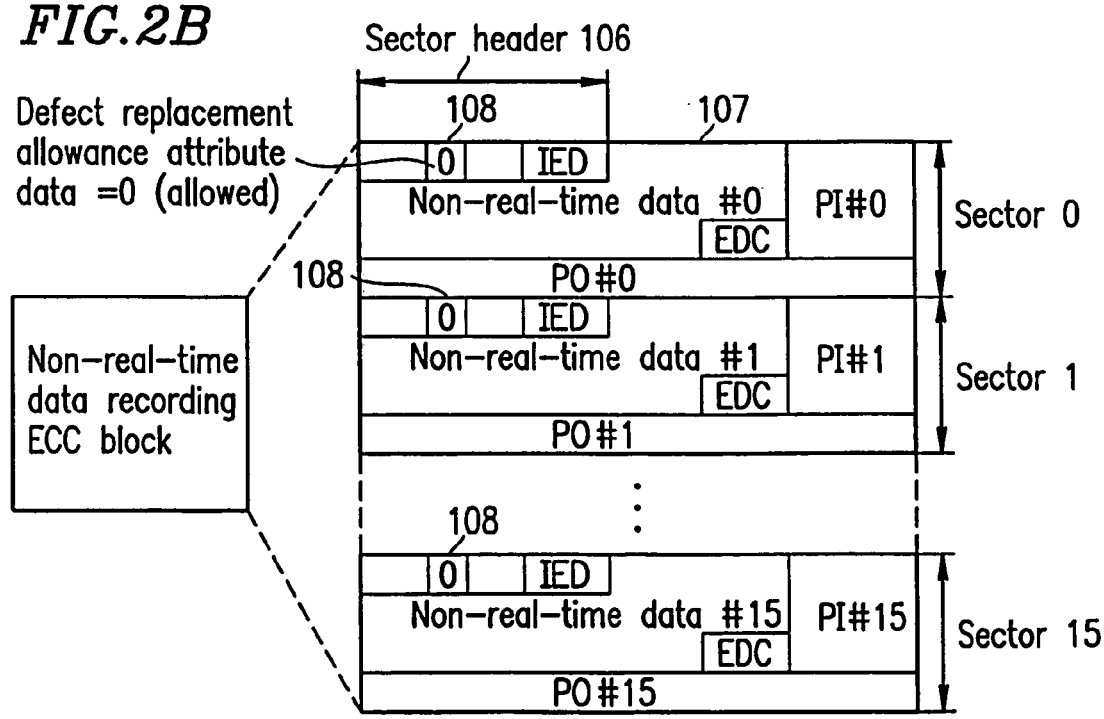

INFORMATION RECORDING MEDIUM, INFORMATION RECORDING METHOD AND INFORMATION REPRODUCTION METHOD

This is a continuation of application Ser. No. 09/800,440, filed Mar. 6, 2001.

BACKGROUND OF THE INVENTION

1. Field of the Invention

The present invention relates to an information recording medium capable of recording both real-time data, such as video and audio data, and non-real-time data, such as a computer program. The present invention also relates to an information recording method for recording information into the information recording medium, and an information reproduction method for reproducing information recorded in the information recording medium.

2. Description of the Related Art

On a phase-change type optical disk or a rewritable optical disk such as a magneto-optical disk, the recorded data is typically provided with an error correction code. Therefore, even when a certain level of error occurs in reading the recorded data from such an optical disk, the error is corrected so that data can be appropriately read out.

However, a material of an optical disk is degraded due to the attachment of dusts, the occurrence of scratches, or the repetition of recording, depending on environments and the number of years for which the disk is used. In an area of an optical disk having such a degradation of the material of the optical disk, an error is likely to occur to a level exceeding a limitation of correction using an error correction code. In terms of the reliability of a disk, such an area (hereinafter referred to as a "defective areas") cannot be used to record and reproduce data.

In conventional rewritable optical disks, an extra area is typically provided in advance for compensating for a defective area (hereinafter referred to as a "spare area"). When a defective area is detected in recording data, a recording apparatus records data, which should have been recorded into the defective area, into a non-defective area in a spare area. Therefore, the reliability of the data is secured. Such a process is generally called a defect management process. The defect management process allows a rewritable disk to be free from error.

In a rewritable optical disk having a large capacity such as a DVD-RAM (Digital Versatile Disc-Random Access Memory), a plurality of sectors (a sector is a minimum unit of a recording area) are handled as a unit to which an error correction code is provided (such a unit including a plurality of sectors, to which an error correction code is provided, is hereinafter referred to as an "ECC block").

A disk recording and reproduction drive can perform recording and reproduction only in units of the ECC block. A control apparatus, such as a personal computer, instructs the disk recording and reproduction drive to execute recording in units of a sector. Therefore, the disk recording and reproduction apparatus needs to execute a process in which an ECC block including a sector specified by a recording command from the control apparatus is read out, data specified by the recording command is rewritten into a portion of the ECC block, and the ECC block is recorded back onto a rewritable optical disk. Such a process is hereinafter referred to as an RMW (Read Modify Write) process.

Hereinafter, a conventional recording method will be described with reference to FIGS. 8 through 11.

FIG. 8 shows a data structure of a conventional rewritable disk 800. As shown in portion (a) of FIG. 8, the disk 800 includes a lead-in area 101, a data area 102, and a lead-out area 103.

The lead-in area 101 contains a control data area 101a and a defect management area 101b. The control data area 101a is an embossed area which is impossible to rewrite. In the control data area 101a, control data, such as the type of a disk and a physical parameters which is referenced by an apparatus in recording and reproducing a disk, is recorded. The defect management area 101b is a rewritable area. In the defect management area 101b, information on a defect in the data area is recorded. A content of the defect management area 101b will be described in detail.

The data area 102 contains a user area 104 for recording user data, and a spare area 105 which contains a replacement area which can be used instead of a defective area detected in the user area 104.

The lead-out area 103 contains a defect management area 103b and a control data area 103a. In the defect management area 103b of the lead-out area 103, the same information as that recorded in the defect management area 101b of the lead-in area 101 is recorded. The reason that the same defect management information is recorded in a plurality of places is that the reliability of a disk can be improved, in case a defective area is present in a defect management area itself.

Portion (b) of FIG. 8 shows a data structure of the defect management area 101b. In the defect management area 101b of the lead-in area 101, two pieces of defect management information, i.e., a DMA1 (Defect Management Area 1) and a DMA2 (Defect Management Area 2), are recorded. The two pieces of defect management information have the same content. Similarly, in the defect management area 103b of the lead-out area 103, two pieces of defect management information, i.e., a DMA1 and a DMA2, are recorded.

Portion (c) of FIG. 8 shows a data structure of a DMA. A DMA contains a DDS (Disc Definition Structure), a PDL (Primary Defect List), and an SDL (Secondary Defect List). In the DDS, information, such as the number of defect management groups in a disk (i.e., the number of sets of a user area and a spare area, which is one in the case of DVD-RAM Version 2.0) and the number of times of updates, is recorded. In the PDL, the positional information of a defective area detected in physically formatting of a disk is recorded. Note that the present invention relates to a process of recording user data after the physical formatting of a disk, and therefore a detailed description of the PDL is omitted. In the SDL, the information used for managing a defective area detected after the physical formatting of a disk is recorded.

Portion (d) of FIG. 8 shows a data structure of the SDL. An SDL identifier is a specific identification code for identifying an SDL (e.g., 0002h [h represents hexadecimal number]). An SDL update number is the number of times in which an SDL has been updated. A PDL update number is the number of times in which a PDL has been updated. The SDL update number and the PDL update number are used to select a DMA to be adopted, when four DMAs have different contents. The purpose is that an up-to-date DMA can be obtained even when an error occurs in updating some of the DMAs. An SDL registration number is the number of registrations of defect positional information following the SDL registration number. In the example shown in portion (d) of FIG. 8, only one set of an address of a defective area A and an address of a replacement area A thereof is registered. In this case, the SDL registration number is one. The address of the defective area A indicates the positional information of a defective area detected in a user area. The address of the replacement area A indicates the positional information of a replacement area A (non-defective area) in a spare area which replaces the defective area A. A recording and reproduction apparatus refers to an SDL and uses a replacement area A instead of a defective area A. Therefore, data can be correctly recorded and reproduced. Such a process in which a defective area in a user area is replaced with a replacement area in a spare area, is called a defect replacement process. Note that as shown in portion (d) of FIG. 8, an unused portion in an SDL is filled with data of FFh.

Portion (e) of FIG. 8 shows a structure of an ECC block which is a part of a non-real-time file for storing non-real-time data, such as a computer program. In a DVD-RAM, one ECC block contains 16 sectors #0 through #15.

Portion (f) of FIG. 8 shows a data structure of a sector. The sector contains a sector header 806 for recording control information, such as address information (positional information), a user data area 107 for recording user data, and an EDC (Error Detection Code) which is an error detection code for data in a user data area. In the sector header 806, the sector information indicating an attribute of the sector, the address information indicating a position of the sector, and an IED (ID Error Detection code), which is a detection code for detecting an error of the sector information and the address information, are recorded. The sector information contains: a sector format indicating whether the disk is divided into a plurality of zones; a tracking method indicating a method for following a track for recording and reproduction of data; a reflectance of the medium; an area attribute indicating whether the sector belongs to a lead-in area or a data area or a lead-out area; a data type indicating whether the sector is rewritable; and a layer number indicating the layer number to which the sector belongs. Note that a reserve area is reserved in case of a future extension. In the reserve area, 00h is recorded. In the user data area 107, 2048 bytes of user data is recorded (one byte is equal to 8 bits). An EDC (Error Detection Code) is a detection code for detecting an error in the user data area 107.

Among data physically recorded on a disk, an error correction code for correcting a read-out error is included in addition to the above-described data structure of a sector. As described above, in a DVD-RAM, a unit of 16 sectors is provided with an error correction code. Hereinafter, an ECC block which is the unit of an error correction code will, be described with reference to FIG. 9.

Portion (a) of FIG. 9 shows a data structure of an ECC block. In one sector, 12 user data rows (one user data row is 172 bytes), 12 internal code rows (one internal code row is 10 bytes), one external code row (172 bytes), and one internal and external code row (10 bytes), are recorded. Such data is converted to data having an ECC block structure as shown in portion (b) of FIG. 9 upon data reproduction. Conversely, upon data recording, data having the ECC block structure as shown in portion (b) of FIG. 9 is converted to the data having the sector structure as shown in portion (a) of FIG. 9. Upon data reproduction, 12 user data rows contained in each sector are initially linked to respective internal code rows. Further, a total of 16 of external code rows, each of which is distributed in a respective sector, and a total of 16 of the internal and external code rows are linked to an end portion of the ECC block structure. In this case, an internal code row m (m is an integer of from 0 to 15) is an error correction code which is provided with a user data row m and which is used to perform correction in a horizontal direction in portion (b) of FIG. 9. The external code row is used to perform correction in a vertical direction throughout the ECC block.

Further, the internal and external code row is located at an overlapping position in the horizontal and vertical directions, and is used both for correction of the external code row in the horizontal direction and for the correction of the internal code row in the vertical direction. Conversely, upon data recording, after an apparatus generates internal codes, external codes, and internal and external codes for the user data rows, the external code rows and the internal and external code rows are distributed and recorded in the respective sectors. Therefore, unless the overall ECC block data (16 sectors) are determined, the external code rows cannot be generated even when the data of one sector is determined. In this case, recording into a sector cannot be executed. As described above, in a DVD-RAM, since the generation of an error correction code and the error correction process using an error correction code cannot be executed in units of a sector, recording and reproduction are executed in units of an ECC block including 16 sectors. Further, a defective area is registered into an SDL in units of an ECC block.

As described above, in a DVD-RAM, recording onto a disk is executed in units of an ECC block. However, in the case of a DVD drive connected to a personal computer, the computer requests a recording process in units of a sector. Therefore, the DVD drive, which accepts a recording request in units of a sector, needs to perform a series of processes (RMW process), i.e., reading out in units of an ECC block, overwriting sector data to be updated, and recording in units of an ECC block. Hereinafter, the RMW process will be described with reference to FIG. 10.

FIG. 10 is a diagram used for explaining a concept of the RMW process. Portion (a) of FIG. 10 conceptually shows data to be recorded. It is assumed that data to be recorded is two sectors, i.e., a sector #16i+15 (i is an integer of zero or more) and a sector #16i+16. In this case, a DVD drive initially reads out data of two ECC blocks, i.e., an ECC block #i to which the sector #16i+15 belongs and an ECC block #i+1 to which the sector #16i+16 belongs (STEP 1). Thereafter, the DVD drive overwrites the data corresponding to the sector #16i+15 and the sector #16i+16 on its buffer memory from which the data has been read out with data to be recorded shown in portion (a) of FIG. 10 (STEP 2). The thus-updated data is recorded back onto a disk in units of an ECC block (STEP 3). As a result of the above-described RMW process, it is found that data only of the sectors #(16i+15) and #(16i+16) are updated in comparison of data (before recording) on the disk shown in portion (b) of FIG. 10 with data (after recording) on the disk shown in portion (d) of FIG. 10.

FIG. 11 is a flowchart showing a flow of the RMW process. Hereinafter, the flow shown in FIG. 11 will be described step by step.

The DVD drive, which has accepted a recording request, determines whether a border of an area specified by the recording request is a border of an ECC block. Such a determination is executed by checking whether a sector number from which recording starts and the number of sectors to be recorded each are an integral multiple of 16. When a border of an area specified by the recording request is a border of an ECC block, the process branches to (S1106). In this case, recording can be executed in units of an ECC block. This is because an RMW process is not required.

When a border of an area specified by the recording request is not a border of an ECC block, the process branches to (S1102) in which an RMW process is executed.

The DVD drive reads out from a disk an ECC block including a sector specified by the recording request (S1102). When the reading out is normally ended, the process branches to (S1105). When the reading out is erroneously ended, the process branches to (S1104) (error end).

The DVD drive updates recording requested portion of read-out data to data specified by the recording request (recording request data) (S1105). Thereafter, the DVD drive records the data updated in (S1105) onto the disk in units of an ECC block (S1106). When an error occurs in the recording process, it is determined that an area into which data will be recorded has a defect. As a result, the process branches to (S1110) in which a defect replacement process is executed. When the recording process is normally ended, the process branches to (S1108).

The DVD drive reads out the data recorded in (S1106), thereby determining whether the recorded data can be normally reproduced (S1108), In this case, the process executed in (S1108) is called a verify process. In a typical verify process, the presence of a margin for reproduction is confirmed in order to secure that data can be normally reproduced at a future time. In the verify process, when it is determined that data cannot be normally reproduced or that a sufficient margin is not secured although data could have been normally reproduced (S1109), it is determined that there is a defect in an area in. which the data is recorded. In this case, the process branches to (S1110). When a margin is secured and reproduction can be executed in the verify process, the process branches to (S1111) (normal end).

When an error is detected in the recording process (S1106, S1107) or the verify process (S1108, S1109), a replacement area which is available from a spare area is allocated, and the processes subsequent to (S1106) are repeatedly applied to the allocated replacement area. As described above, recording can be executed in units of a sector for a DVD-RAM which can be recorded only in units of an ECC block including a plurality of sectors.

However, the above-described RMW process is based on the premise that an ECC block including an area specified in a recording request can be reproduced. That is, when it is determined in (S1103) of FIG. 11 that an error occurs, the process immediately goes to the error end. The reason of the immediate error end as a result of such a determination is that data other than the area specified in the recording request cannot be obtained although recording can be executed only in units of an ECC block. To avoid such a situation, in conventional-DVD drives, the verify step such as (S1108, S1109) shown in FIG. 11 is provided. The verify step assures reproduction.

On the other hand, a method without verification of the recorded data has been proposed in order to secure that video and audio data is recorded onto a disk in real-time (e.g., Japanese Laid-open Publication No. 10-516372). As described above, when the verification of recorded data and the defect replacement process in which a defective area is replaced with a replacement area, are not executed, there may be an occurrence of a partial area on a disk in which reproduction cannot be executed. As a result, the error end may occur in the RMW process. When such a situation occurs in a computer environment, a fatal problem arises in which data cannot be saved on the disk. In addition, a serious problem may arise in which the computer itself hangs up.

SUMMARY OF THE INVENTION

According to one aspect of the present invention, an information recording medium comprises a user area, and a spare area including a replacement area, wherein the replacement area may be used instead of a defective area in the user area. The user area and the spare area include a plurality of sectors. Each of the plurality of sectors includes a user data area for recording user data, and an attribute data area for recording defect replacement allowance attribute data. The defect replacement allowance attribute data indicates whether recording of the user data has been executed in a state that the execution of a defect replacement process is allowed, wherein in the defect replacement process, the defective area in the user area is replaced with the replacement area in the spare area. Therefore, the above-described object of the present invention is achieved.

In one embodiment of the present invention, real-time data may be recorded as the user data in each of one or more sectors of the plurality of sectors, real-time reproduction being required for the real-time data. In each of the one or more sectors, defective replacement allowance attribute data having a first attribute value indicating that the recording of the user data has not been executed in the state that the execution of the defect replacement process is allowed, may be recorded.

In one embodiment of the present invention, non-real-time data may be recorded as the user data in each of one or more sectors of the plurality of sectors, non-real-time reproduction -not being required for the non-real-time data. In each of the one or more sectors, defective replacement allowance attribute data having a second attribute value indicating that the recording of the user data has been executed in the state that the execution of the defect replacement process is allowed, may be recorded.

In one embodiment of the present invention, the defective area may be an ECC block including a defective sector, and the defect replacement process is executed in units of an ECC block.

In one embodiment of the present invention, recording of information into the information recording medium may be executed in units of an ECC block, the ECC block including a plurality of sectors. Attribute values of all defect replacement allowance attribute data included in the plurality of sectors in the ECC block may be set to the same attribute value.

According to another aspect of the present invention, an information recording method is provided for recording information into an information recording medium including a user area, and a spare area including a replacement area, wherein the replacement area may be used instead of a defective area in the user area. The user area and the spare area include a plurality of sectors. Each of the plurality of sectors includes a user data area for recording user data, and an attribute data area. The information recording method comprising the steps of (a) recording user data into the user data area, (b) generating defect replacement allowance attribute data, and (c) recording the defect replacement allowance attribute data into the attribute data area. The defect replacement allowance attribute data indicates whether recording of the user data has been executed in a state that the execution of a defect replacement process is allowed, wherein in the defect replacement process, the defective area in the user area is replaced with the replacement area in the spare area. Therefore, the above-described objective of the present invention is achieved.

In one embodiment of the present invention, the step (a) may include the steps of recording real-time data as the user data in the user data area, real-time reproduction being required for the real-time data, and continuing the recording of the real-time data without performing the defect replacement process, even when a defective area is detected during recording of the real-time data. The step (b) may include the step of setting an attribute value of the defective replacement allowance attribute data to a first attribute value indicating that the recording of the user data has not been executed in the state that the execution of the defect replacement process is allowed.

In one embodiment of the present invention, the step (a) may include the steps of recording non-real-time data as the user data in the user data area, real-time reproduction not being required for the non-real-time data, and executing the defect replacement process, when a defective area is detected during recording of the non-real-time data. The step (b) may include the step of setting an attribute value of the defective replacement allowance attribute data to a second attribute value indicating that the recording of the user data has been executed in the state that the execution of the defect replacement process is allowed.

In one embodiment of the present invention, the defective area may be an ECC block including a defective sector, and the defect replacement process is executed in units of the ECC block.

In one embodiment of the present invention, recording of information into the information recording medium may be executed in units of an ECC block, the ECC block including a plurality of sectors. The information recording method may further comprise the step of setting attribute values of all defect replacement allowance attribute data included in the plurality of sectors in the ECC block to the same attribute value.

According to another aspect of the present invention, an information reproduction method is provided for reproducing information recorded on an information recording medium including a user area, and a spare area including a replacement area, wherein the replacement area may be used instead of a defective area in the user area. The user area and the spare area include a plurality of sectors. The information reproduction method comprises the steps of (a) reading out data recorded in the information recording medium, (b) determining whether a read-out error of the data occurs, (c) reading out defect replacement allowance attribute data from a sector, the data being recorded in the sector, when it is determined that a read-out error of the data occurs, and (d) executing an error process depending on an attribute value of the read-out defect replacement allowance attribute data. The defect replacement allowance attribute data indicates whether recording of the data has been executed in a state that the execution of a defect replacement process is allowed, wherein in the defect replacement process, the defective area in the user area is replaced with the replacement area in the spare area. Therefore, the above-described objective is achieved.

In one embodiment of the present invention, the step (d) may include the steps of (d-1) determining whether the attribute value of the read-out defect replacement allowance attribute data is equal to a first attribute value indicating that the recording of the user data has not-been executed in the state that the execution of the defect replacement process is allowed, and (d-2) ignoring the read-out error of the data and continuing a reproduction process, when it is determined that the attribute value of the read-out defect replacement allowance attribute data is equal to the first attribute value.

In one embodiment of the present invention, the step (d-2) may include the step of replacing at least a portion of the data with predetermined dummy data.

In one embodiment of the present invention, each of the plurality of sectors may include a sector header. The sector header may include the defect replacement allowance attribute data, and a sector header error detection code for detecting a read-out error of the sector header. The step (c) may include the steps of (c-1) detecting the read-out error of the sector header using the sector header error detection code, and (c-2) reading out the defect replacement allowance attribute data from a sector, the read-out error of the sector header not being detected from the sector.

In one embodiment of the present invention, recording of data into the information recording medium may be executed in units of an ECC block, the ECC block including a plurality of sectors. The step (c) may include the step of (c-1) reading out one or more defect replacement allowance attribute data from one or more sectors of the plurality of sectors included in the ECC block, the data being recorded in the ECC block. The step (d) may include the step of (d-1) executing an error process depending on an attribute value of the read-out one or more defect replacement allowance attribute data.

In one embodiment of the present invention, each of the plurality of sectors may include a sector header. The sector header may include the defect replacement allowance attribute data, and a sector header error detection code for detecting a read-out error of the sector header. The step (c-1) may include the steps of (c-1-1) detecting the read-out error of the sector header using the sector header error detection code, and (c-1-2) reading out the defect replacement allowance attribute data from at least one sector successively from a leading sector, the read-out error of the sector header not being detected.

In one embodiment of the present invention, the step (d-1) may include the step of (d-1-1) determining whether the error process is executed based on majority rule of the attribute values of at least one defect replacement allowance attribute data, the read-out error of the sector header not being detected from at least one sector including the at least one defect replacement allowance attribute data.

In one embodiment of the present invention, each of the plurality of sectors may include the defect replacement allowance attribute data, an internal code PI for correcting an error in one sector, and an external code PO for correcting an error over one ECC block. The step (c-1) may includes the steps of (c-1-1) detecting an error not correctable in one sector using the internal code, and (c-1-2) reading out the defect replacement allowance attribute data from at least one sector successively from a leading sector, the error not correctable in one sector not being detected.

In one embodiment of the present invention, the step (d-1) may include the step of (d-1-1) determining whether the error process is executed based on majority rule of the attribute values of at least one defect replacement allowance attribute data, the error not correctable in one sector not being detected from at least one sector including the at least defect replacement allowance attribute data.

According to another aspect of the present invention, an information reproduction method is provided for reproducing information recorded on an information recording medium including a user area, and a spare area including a replacement area, wherein the replacement area may be used instead of a defective area in the user area. The user area and the spare area include a plurality of sectors. The information reproduction method comprises the steps of determining whether a format of data recorded in the information recording medium is a predetermined format, reading out defect replacement allowance attribute data from a sector, the data being recorded in the sector, when it is determined that the format of data recorded in the information recording medium is the predetermined format, and determining whether reproduction of data recorded in the information recording medium is allowed, in accordance with an attribute value of the read-out defect replacement allowance attribute data. The defect replacement allowance attribute data indicates whether recording of the user data has been executed in a state that the execution of a defect replacement process is allowed, wherein in the defect replacement process, the defective area in the user area is replaced with the replacement area in the spare area.

Thus, the invention described herein makes possible the advantages of providing an information recording medium, an information recording method, and an information reproduction method capable of preventing occurrence of an error end of a RMW process in a computer environment.

These and other advantages of the present invention will become apparent to those skilled in the art upon reading and understanding the following detailed description with reference to the accompanying figures.

BRIEF DESCRIPTION OF THE DRAWINGS

FIG. 1 is diagram showing a data structure of an information recording disk 100 according to Example 1of the present invention.

FIG. 2A is diagram showing a data structure of an ECC block recorded in the information recording disk 100.

FIG. 2B is diagram showing a data structure of an ECC block recorded in the information recording disk 100.

DESCRIPTION OF THE PREFERRED EMBODIMENTS

Hereinafter, the present invention will be described by way of illustrative examples with reference to the accompanying drawings. Note that an information recording disk (optical disk) is described below as an exemplary information recording medium. The present invention can be applied to any type of information recording medium.

EXAMPLE 1

Figure 8:
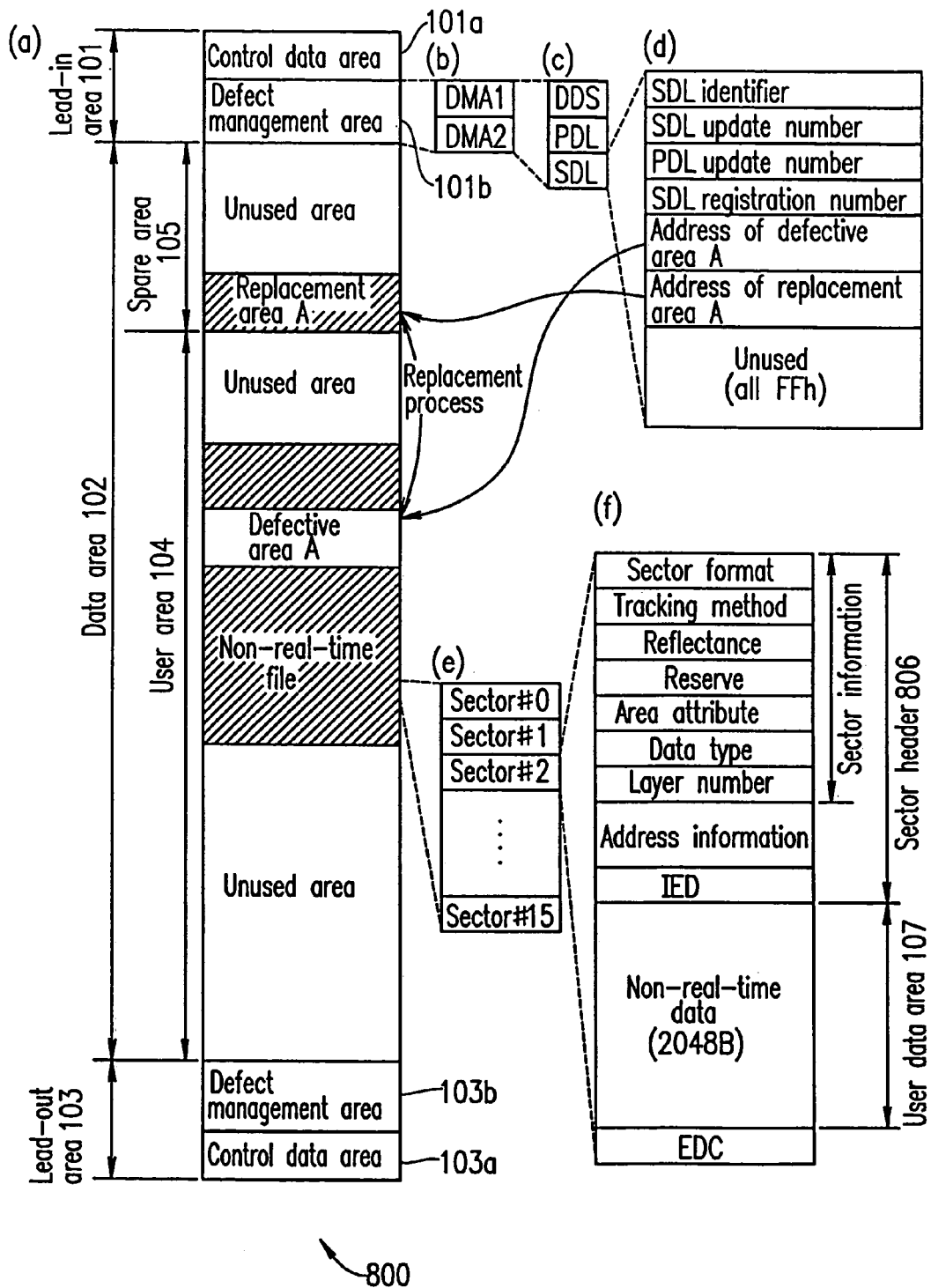
FIG. 8 is a diagram showing a structure of a conventional rewritable disk 800.
Figure 9:
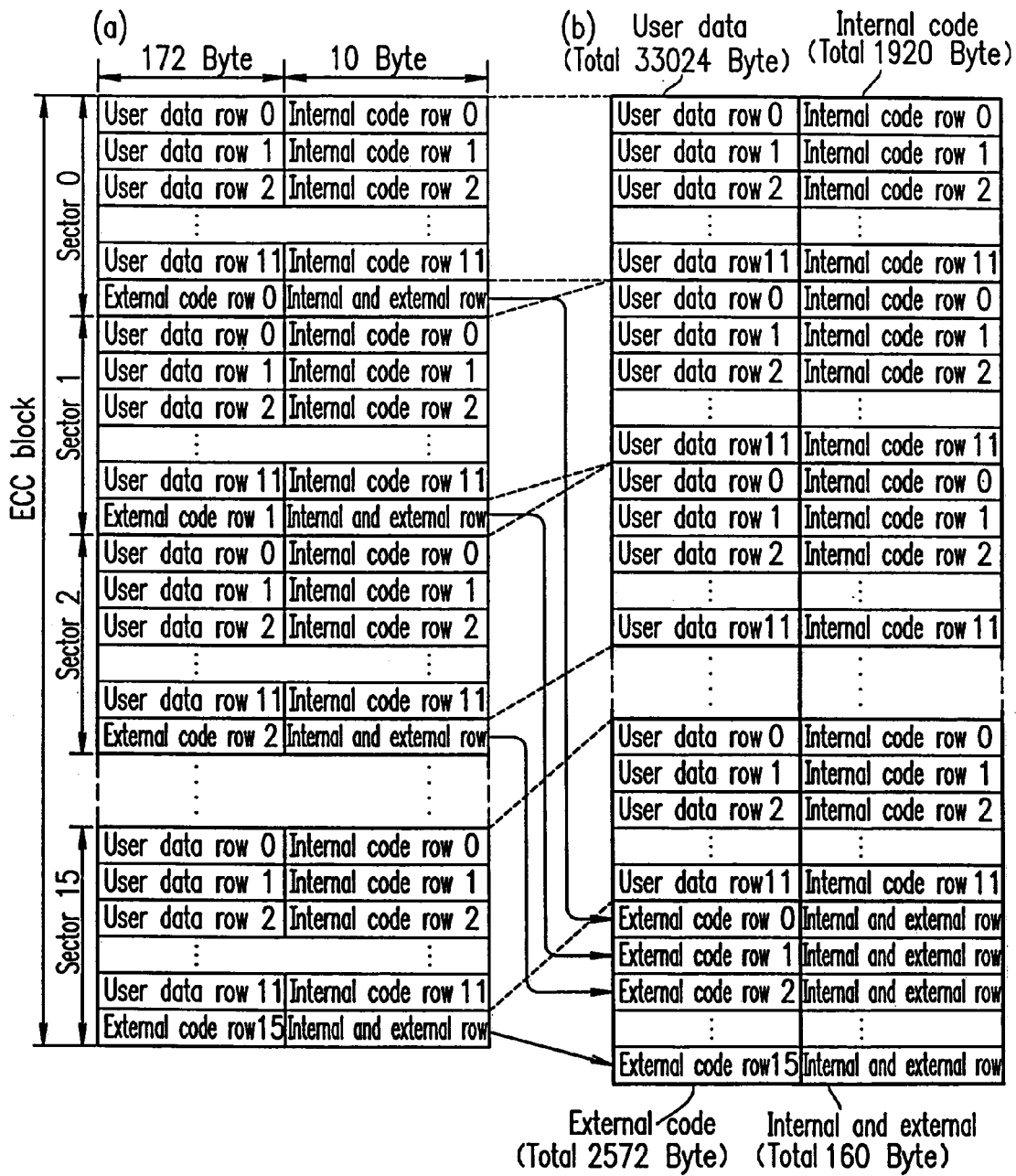
FIG. 9 is a diagram used for explaining an ECC block which is a unit of an error correction code.
Figure 10:
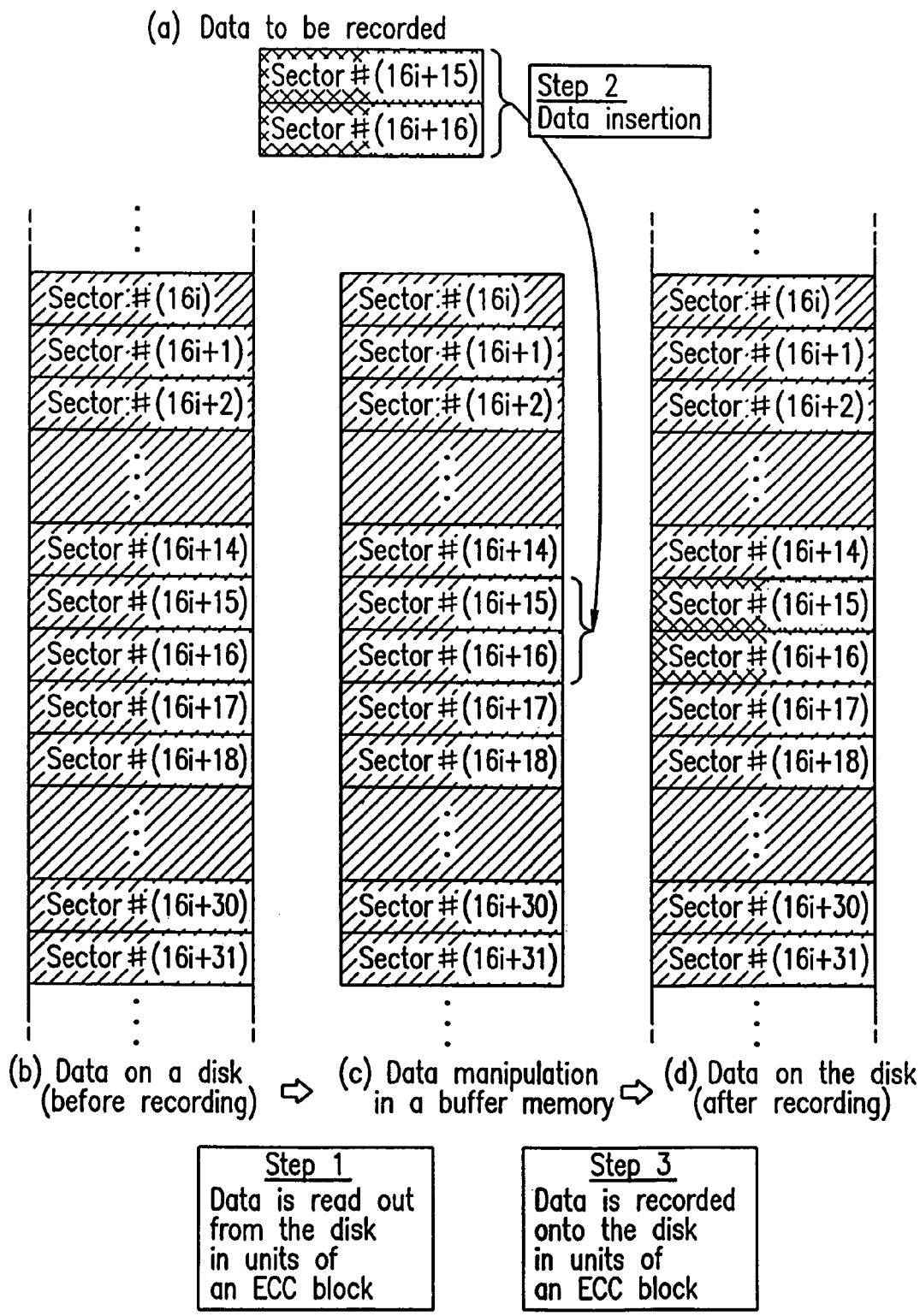
FIG. 10 is a diagram used for explaining a concept of an RMW process.
Figure 11:
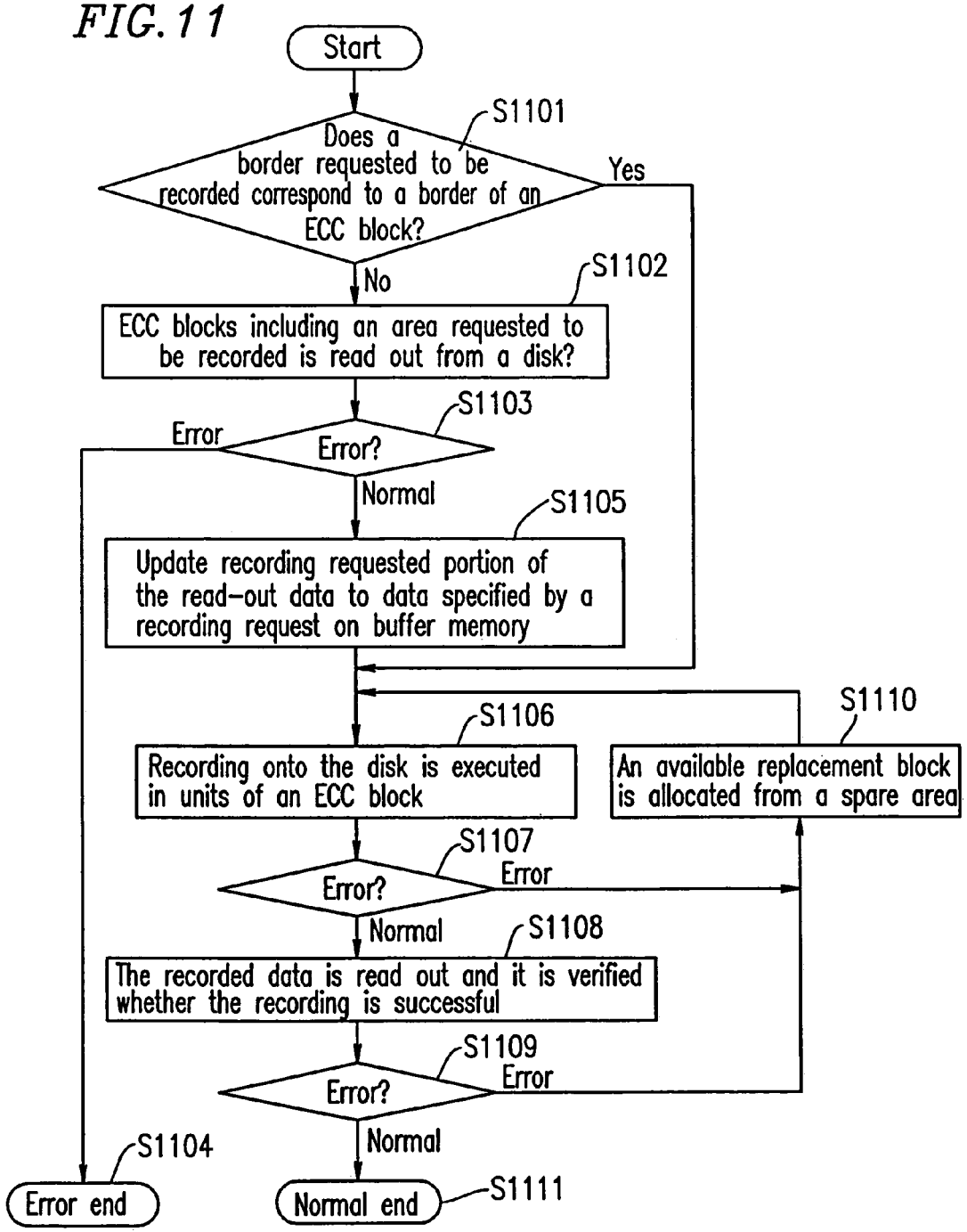
FIG. 11 is a flowchart showing a flow of the RMW process.

FIG. 1 shows a data structure of an information recording disk 100 according to Example 1of the present invention. In FIG. 1, the same components as those of the information recording disk 800 of FIG. 8 are indicated by the same reference numerals, and a description of such components is omitted.

Portion (a) of FIG. 1 shows a situation where one non-real-time file (parallel hatches) including non-real-time data which does not require real-time reproduction and one real-time file (crossed hatches) including real-time data which requires real-time reproduction are recorded in a user area 104 of the information recording disk 100.

The non-real-time data is, for example, a computer program. Then real-time data is, for example, AV (Audio/Video) data including at least one of video data and audio data.

In the example shown in portion (a) of FIG. 1, a portion of the non-real-time file is recorded in a spare area 105. This is a result of the execution of a defect replacement process for replacing a defective area in the user area 104 with a replacement area in the spare area 105, when the defective area is detected in the user area during the recording of the non-real-time file in the user area 104.

The user area 104 and the spare area 105 include a plurality of sectors. Each sector has a data structure in which an attribute data area 108 for recording a defect replacement allowance attribute data is added to a sector header (see portions (b) and (c) of FIG. 1), in comparison with the data structure of a sector of the conventional disk 800 of FIG. 8. Note that in the example shown in FIG. 1, the attribute data area 108 is provided in the sector header. However, the position of the attribute data area 108 is not limited to this. The attribute data area 108 may be placed at an arbitrary fixed position within a sector.

The defect replacement allowance attribute data indicates whether recording of user data into the user data area 107 has been executed in a state that the execution of a defect replacement process for replacing a defective area in the user area 104 with a replacement area in the spare area 105 is allowed. The defect replacement allowance attribute data takes either of an attribute value "0" (allowed) or "1" (forbidden), for example.

The value "0" (allowed) of the defect replacement allowance attribute data recorded in the attribute data area 108 of a sector indicates that the recording of user data into the user data area 107 in the same sector has been executed in a state that the execution of the defect replacement process is allowed.

The value "1" (forbidden) of the defect replacement allowance attribute data recorded in the attribute data area 108 of a sector indicates that the recording of user data into the user data area 107 in the same sector has not been executed in a state that the execution of the defect replacement process is allowed (i.e., the recording of user data into the user data area 107 in the same sector has been executed in a state that the execution of the defect replacement process is forbidden).

Portion (b) of FIG. 1 shows a data structure of the sector in which the non-real-time data contained in the non-real-time file is recorded.

The non-real-time data is recorded in the user data area 107 in the sector in the state that the execution of the defect replacement process is allowed. Therefore, the attribute value of the defect replacement allowance attribute data recorded in the attribution data area 108 is set to "0" (allowed).

Note that the defect replacement allowance attribute data does not indicate whether the defect replacement process has been actually executed during the recording of user data, but indicates whether the recording of user data has been executed in the state that the execution of the defect replacement process is allowed. When a non-real-time file is recorded in an area of the user area 104, the attribute value of the defect replacement allowance attribute data of each sector included in the area is set to "0" (allowed), regardless of whether the area has been replaced with the replacement area in the spare area 105.

Since the reliability of data is required for non-real-time data, such as a computer program, the defect replacement process needs to be used to secure the reliability of data. The attribute value of the defect replacement allowance attribute data of a sector in which non-real-time data is recorded (a non-real-time data recording sector) is set to "0" (allowed).

Portion (a) of FIG. 1 shows a data structure of a sector in which real-time data contained in a real-time file is recorded.

The real-time data is recorded in the user data area 107 in the sector in the state that the execution of the defect replacement process is forbidden. In this case, the attribute value of the defect replacement allowance attribute data recorded in the attribution data area 108 is set to "1" (forbidden).

It is important for real-time data, such as AV data, to be reproduced and recorded in real-time. In comparison with non-real-time data, the reliability of data is less required. Further, when a portion of a real-time file is recorded in a spare area as a result of a defect replacement process during the recording of the real-time file, a reproduction head needs to be moved from a user area to the spare area during the reproducing of the real-time file. In this case, the movement of the reproduction head causes a delay in reproduction, which may lead to prevention of continuous reproduction of the real-time file. In this case, for example, video or audio may be skipped, or noise may occur during the reproduction.

According to the above-described reasons, the execution of the defect replacement process is forbidden during the recording of a real-time file. The attribute value of the defect replacement allowance attribute data of a sector in which real-time data is recorded (a real-time data recording sector) is set to "1" (forbidden).

Note that the above-described defect replacement process may be executed in units of a sector or in units of an ECC block including a plurality of sectors (e.g., 16 sectors). When the defect replacement process may be executed in units of a sector, a defective sector (defective area) in the user area 104 is replaced with a replacement sector (replacement area) in the spare area 105. When the defect replacement process may be executed in units of an ECC block, an ECC block (defective area) in the user area 104 is replaced with an ECC block (replacement area) in the spare area 105.

As described above, according to the information recording disk of the present invention, each sector is provided with an attribute data area for recording a defect replacement allowance attribute data indicating whether the recording of user data has been executed in the state that the execution of a defect replacement process is allowed. Thus, the defect replacement allowance attribute data can be recorded in an information recording disk.

When the recording of user data has not been executed in the state that the execution of a defect replacement process is allowed (i.e., the recording of user data has been executed in the state that the execution of a defect replacement process is forbidden), the attribute value of the defect replacement allowance attribute data is set to a first attribute value (e.g., "1" representing "forbidden"). When the recording of user data has been executed in the state that the execution of a defect replacement process is allowed, the attribute value of the defect replacement allowance attribute data is set to a second attribute value (e.g., "0" representing "allowed").

The defect replacement allowance attribute data recorded in an information recording disk allows an error process depending on the attribute value of the defect replacement allowance attribute data, when a reproduction apparatus detects an error in reading out user data recorded in the information recording disk. The concept of the "error process depending on the attribute value of the defect replacement allowance attribute data" is based on an idea that an error occurring in reading out the recorded user data is handled in a manner varying depending on the reliability of the user data. The reliability of recorded user data is inevitably lower when the execution of a defect replacement process is forbidden in recording user data than when the execution of a defect replacement process is allowed. Therefore, when the execution of a defect replacement process is forbidden, it is not appropriate that the occurrence of an error in reading out user data is handled as an exceptional situation. In such a case, a certain recovery process should be suitably executed. For example, when the execution of a defect replacement process is forbidden, a reproduction apparatus may perform the following recovery process: the error in reading out user data is ignored so that a reproduction process is continued (e.g., in an RMW process, among 16 sectors included in an ECC block including one sector specified by a recording request, 15 sectors other than the specified sector are subjected to data padding).

Since the recording of real-time data is executed in a state that the execution of a defect replacement process is forbidden, the attribute value of the defect replacement allowance attribute data of a sector in which the real-time data is recorded is set to a first attribute value (e.g., "1" representing "forbidden"). Since the recording of non-real-time data is executed in a state that the execution of a defect replacement process is allowed, the attribute value of the defect replacement allowance attribute data of a sector in which the non-real-time data is recorded is set to a second attribute value (e.g., "0" representing "allowed"). As a result, by referring to the attribute value of the defect replacement allowance attribute data recorded in a sector, it can be determined whether user data recorded in the sector is real-time data or non-real-time data. This means that the defect replacement allowance attribute data also functions as a flag indicating whether or not a file recorded in an information recording disk is a real-time file.

EXAMPLE 2

Hereinafter, a data structure of the information recording disk 100 when user data is recorded and reproduced in units of an ECC block will be described (the ECC block is a unit when an error correction process is executed).

FIGS. 2A and 2B show data structures of an ECC block recorded in the information recording disk 100. One ECC block contains a plurality of sectors (e.g., 16 sectors).

Each sector includes: a sector header 106; a user data area 107 for recording user data; an area for recording an EDC which is an error detection code for the sector header 106 and the user data area 107; an area for recording an internal code PI which is a correction code closed within a sector; and an area for recording an external code PO provided over an ECC block. Note that the details of the internal code PI and the external code PO are described in the DESCRIPTION OF THE RELATED ART section. A description of the codes is here omitted.

The sector header 106 contains an attribute data area 108 for recording defect replacement allowance attribute data, and an area for recording an IED which is an error detection code in the sector header 106. Note that the sector header 106 may contain an area for recording other control information which is however omitted here.

The attribute values of all defect replacement allowance attribute data contained in a plurality of sectors in one ECC block are set to the same attribute value.

Note that in the example shown in FIGS. 2A and 2B, an attribute data area 108 is provided in the sector header 106. However, the position of the attribute data area 108 is not limited to this. The attribute data area 108 may be placed at any fixed position in a sector.

FIG. 2A shows a data structure of an ECC block in which real-time data is recorded (a real-time data recording ECC block).

Real-time data is recorded in each sector in an ECC block in the state that the execution of a defect replacement process is forbidden. If a defect replacement process is executed in recording real-time data, the defect replacement process may lead to prevention of continuous reproduction of the real-time data. Therefore, the attribute values of all defect replacement allowance attribute data in an ECC block in which real-time data is recorded are set to "1" (forbidden).

FIG. 2B shows a data structure of an ECC block in which non-real-time data is recorded (a non-real-time data recording ECC block).

Non-real-time data is recorded in each sector in an ECC block in the state that the execution of a defect replacement process is allowed. The reason is that in the case of the recording of non-real-time data, the greater reliability of data is required than the continuity of data. Therefore, the attribute values of all defect replacement allowance attribute data in an ECC block in which non-real-time data is recorded are set to "0" (allowed).

As described above, effects similar to those described in Example 1 can be obtained by recording defect replacement allowance attribute data in an information recording disk.

EXAMPLE 3

Figure 3:
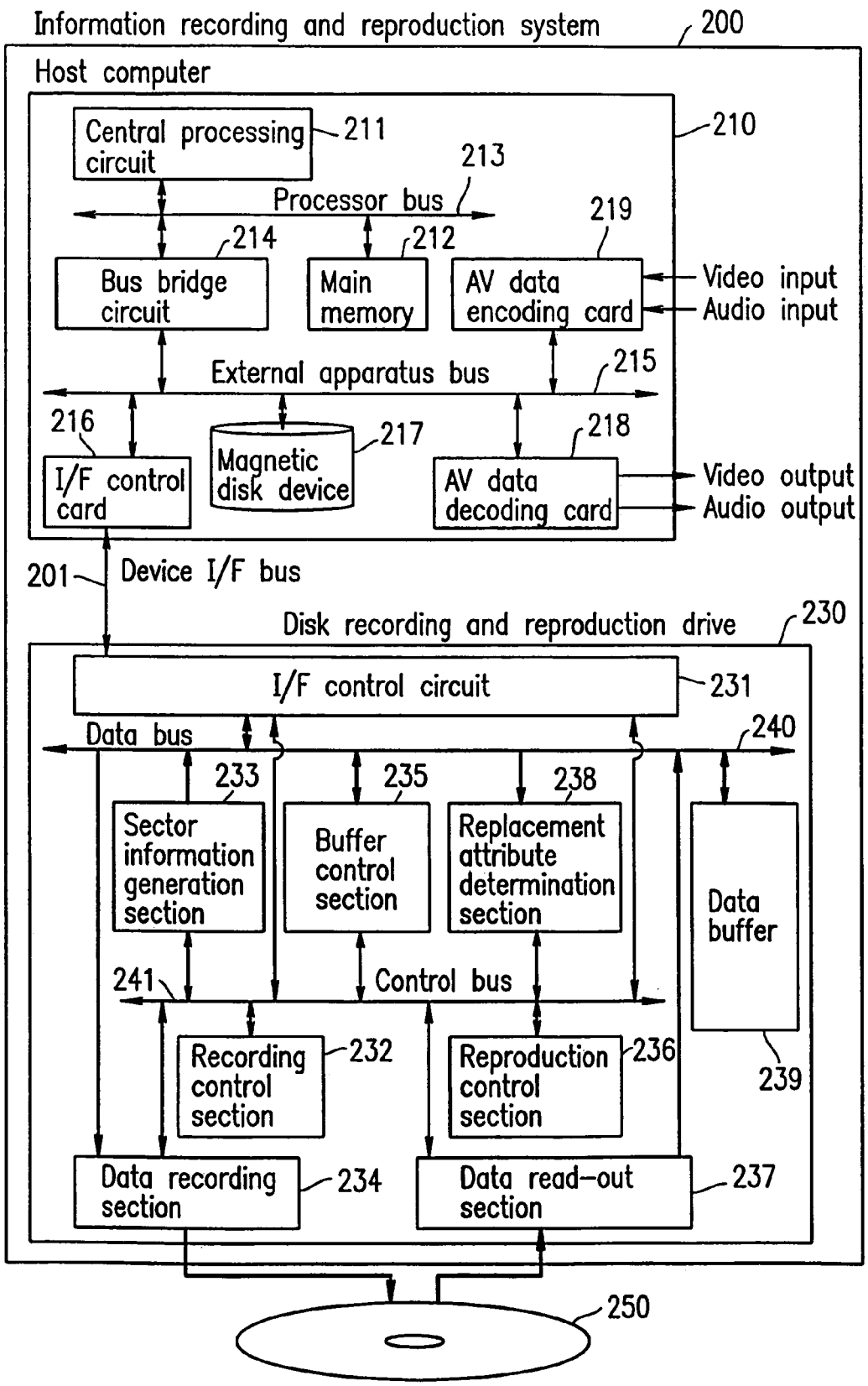
FIG. 3 is a block diagram showing a structure of an information recording and reproduction system 200 according to Example 3 of the present invention.

FIG. 3 shows a structure of an information recording and reproduction system 200 according to Example 3 of the present invention. The information recording and reproduction system 200 records information into the information recording medium 100, or reproduces information recorded in the information recording medium 100.

The information recording and reproduction system 200 includes a host computer 210, a disk recording and reproduction drive 230, and a device I/F bus 201 connecting therebetween.

A rewritable disk 250 is an example of the information recording medium 100 described with reference to FIGS. 1 and 2.

The host computer 210 includes: a central processing circuit 211 for performing an operation; a main memory 212 for storing an execution program and data required for an operation; a processor bus 213 for connecting the central processing circuit 211 and the main memory 212; an external apparatus bus 215 for connecting to a peripheral; a bus bridge circuit 214 for connecting the processor bus 213 and the external apparatus bus 215; an I/F control card 216 for communicating with a disk recording and reproduction drive 230 as a peripheral; a magnetic disk apparatus 217; an AV data decoding card 218 for decoding AV data and outputting the result as an analog audio/video signal; and an AV data encoding card 219 for converting an input analog audio/video signal to digital data.

The disk recording and reproduction drive 230 includes: an I/F control circuit 231 for communicating with the host computer 210 via the device I/F bus 201; a recording control section 232 for controlling a recording process in response to a recording request from the host computer 210; a sector information generation section 233 for generating sector information before a recording process and providing the sector information for data to be recorded; a data recording section 234 for recording data stored in a data buffer 239 at a specified position of the rewritable disk 250; a buffer control section 235 for controlling data manipulation and the like in the data buffer 239; a reproduction control section 236 for controlling a reproduction process in response to a reproduction request from the host computer 210; a data read-out section 237 for reading out data from a specified position of the rewritable disk 250 and storing the data in the data buffer 239; a replacement attribute determination section 238 for determining the attribute value of the defect replacement allowance attribute data when the data read-out section 237 detects a read-out error; the data buffer 239 for temporarily storing data to be recorded and reproduced data; a data bus 240 functioning as a transmission path for transmitting and receiving data to and from each section and the data buffer 239; and a control bus 241 functioning as a transmission path for transmission and reception of control information, such as a command and a process result, between each section.

Note that each section included in a disk recording and reproduction drive may be realized by hardware, software, or a combination thereof.

Next, a specific operation of the disk recording and reproduction drive 230 will be described with reference to FIGS. 4 through 7.

Figure 4:
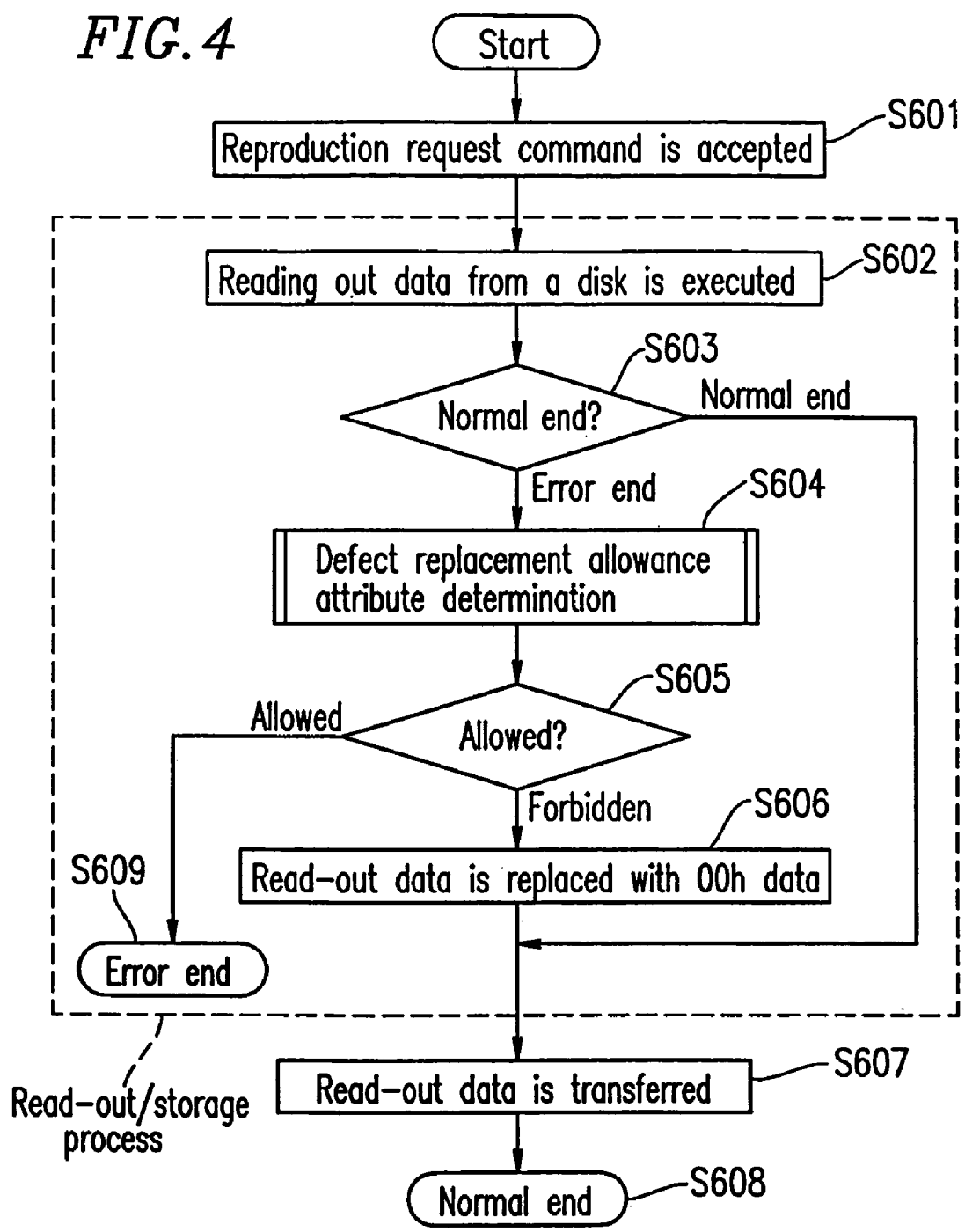
FIG. 4 is a flowchart showing a flow of a reproduction process in which a disk recording and reproduction drive 230 reproduces data recorded in a rewritable disk 250.

FIG. 4 is a flowchart showing a flow of reproducing data recorded in the rewritable disk 250.

The I/F control circuit 231 of the disk recording and reproduction drive 230 accepts a reproduction request command from the host computer 210 (S601). The I/F control circuit 231 transmits to the reproduction control section 236 an instruction that data is to be read out from an area specified by the reproduction request command. When the reproduction control section 236 accepts the instruction from the I/F control circuit 231, the reproduction control section 236 transmits a data read-out request to the data read-out section 237.

The data read-out section 237 reads out the data recorded in the specified area in the rewritable disk 250, and stores the read-out data into the data buffer 239 (S602). The data read-out section 237 performs an error correction process using an error correction code for the read-out data.

The data read-out section 237 determines whether the data read-out process is normally ended, and returns a result of the determination (normal end/error end) to the reproduction control section 236 (S603). When the error correction process is normally ended, "normal end" is returned to the reproduction control section 236. When correct data cannot be restored, since more errors are detected than can be corrected in the error correction process, "error end" is returned to the reproduction control section 236.

When the reproduction control section 236 accepts a determination result indicating "normal end" from the data read-out section 237, the reproduction control section 236 reports the normal end to the I/F control circuit 231.

When the reproduction control section 236 accepts a determination result indicating "error end" from the data read-out section 237, the reproduction control section 236 instructs the replacement attribute determination section 238 to determine the attribute value of defect replacement allowance attribute data. The replacement attribute determination section 238 performs a defect replacement allowance attribute determination process (S604). The details of the defect replacement allowance attribute determination process are described later with reference to FIG. 5. The replacement attribute determination section 238 returns a result of the determination (allowed/forbidden) to the reproduction control section 236.

When the reproduction control section 236 accepts a determination result indicating "allowed" from the replacement attribute determination section 238, the reproduction control section 236 reports the error end to the I/F control circuit 231. As a result, the reproduction is erroneously ended (S609).

When the reproduction control section 236 accepts a determination result indicating "forbidden" from the replacement attribute determination section 238, the reproduction control section 236 instructs the buffer control section 235 to replace data, which is read out from a specified area on the rewritable disk 250 and is stored in the data buffer 239, with dummy data (e.g., 00h data). The buffer control section 235 replaces the data stored in the data buffer 239 with dummy data (e.g., 00h data) in accordance with the instruction from the reproduction control section 236 (S605, S606). Thereafter, the buffer control section 235 returns a report of completion to the reproduction control section 236.

When the data read-out process is normally completed, or when the data read-out process is erroneously ended but the defect replacement allowance attribute determination process (S604) results in "forbidden", so that read-out data is replaced with dummy data (e.g., 00h data), the reproduction control section 236 reports a normal end to the I/F control circuit 231.

When the I/F control circuit 231 accepts a report of normal end from the reproduction control section 236, the I/F control circuit 231 transfers data stored in the data buffer 239 to the host computer 210. As a result, the reproduction process is normally ended (S608).

As described above, according to an information reproduction method, when an error occurs in reading out data recorded in an information recording medium, an error process can be executed depending on the attribute value of defect replacement allowance attribute data by referring to the attribute value of defect replacement allowance attribute data recorded in the information recording medium.

For example, when the attribute value of defect replacement allowance attribute data indicates that the data has been recorded in the state that the execution of a defect replacement process is forbidden, the disk recording and reproduction drive 230 ignores the read-out error of the data (e.g., replaces the read-out data with dummy data) so that the reproduction process is continued.

The recording of real-time data is executed in the state that the execution of a defect replacement process is forbidden, so that the attribute value of the defect replacement allowance attribute data of a sector in which the real-time data is recorded is set to "forbidden". Therefore, even when a read-out error is detected in reproducing real-time data, the reproduction process is not erroneously ended. Therefore, the recording and reproduction of real-time data can be executed without occurrence of an error even under a computer environment.

Further, in the above-described information reproduction method, even when an error is detected in reading out data, if the recording of the data is executed in the state that the execution of a defect replacement process is forbidden, read-out data is replaced with dummy data (e.g., 00h data). When the dummy data is returned, a recovery process can be executed. The recovery process is, for example, a process in which the dummy data is not reproduced, but data is obtained by interpolating video data before and after the dummy data.

Note that dummy data is not limited to 00h data. Dummy data may be other than 00h data.

Figure 5:
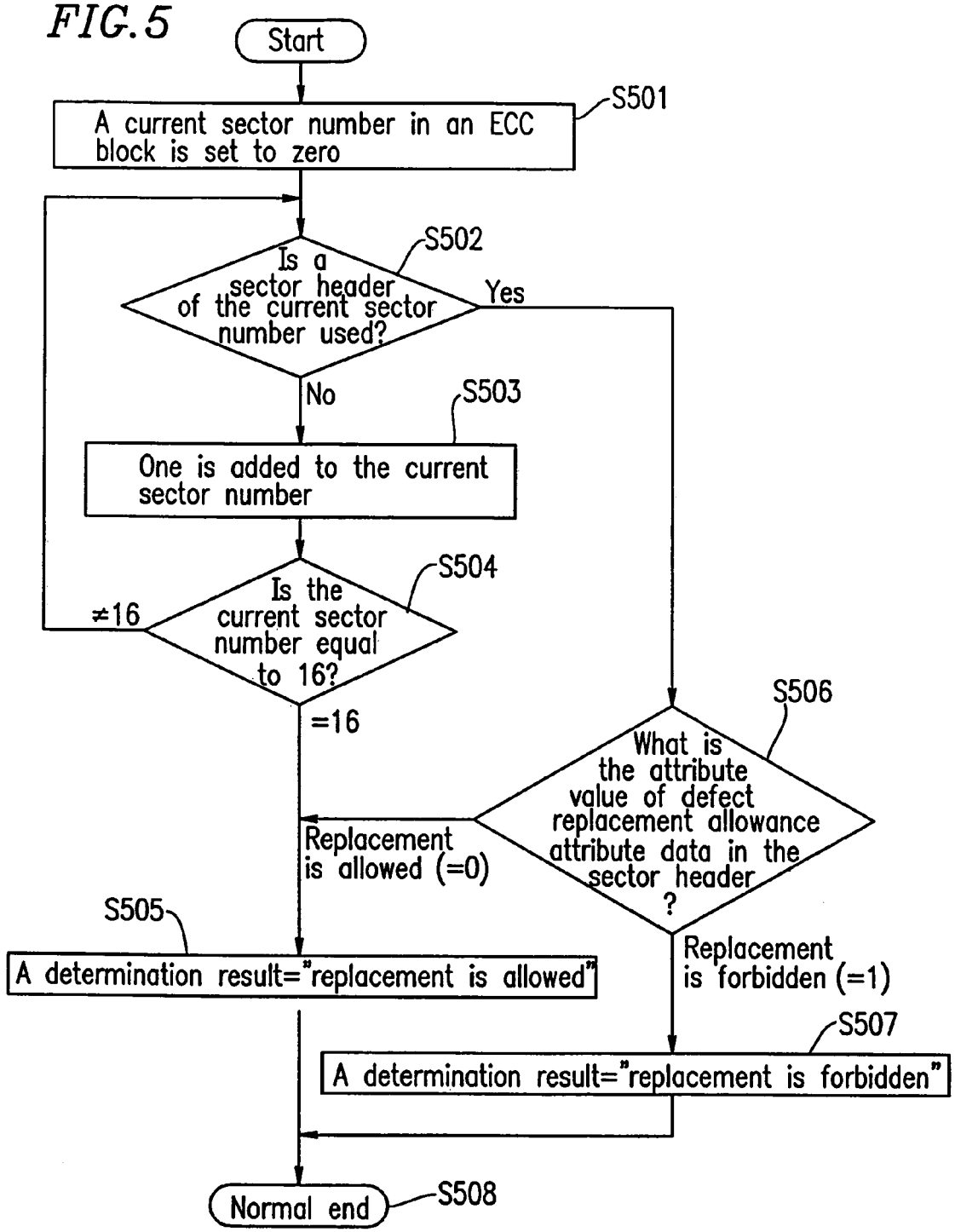
FIG. 5 is a flowchart showing a flow of a defect replacement allowance attribute determination process shown in FIG. 4.

FIG. 5 is a flowchart showing a flow of a defect replacement allowance attribute determination process shown in (S604) of FIG. 4. Note that in an example shown in FIG. 5, an area specified by a reproduction request is one sector, one ECC block including the specified sector is read out from the rewritable disk 250, and the ECC block is stored in the data buffer 239. Further, even when an error occurs in reading out data, data including an error is stored by the data buffer 239.

The replacement attribute determination section 238 initially sets a current sector number in an ECC block to zero (S501). The term "current sector number in an ECC block" herein means the number of a sector, which is currently subjected to a process, of a plurality of sectors (16 sectors in this example) contained in an ECC block in which a read-out error occurs. Note that sector numbers 0, 1, 2, . . . , and 15 are sequentially assigned to the respective sectors contained in an ECC block successively from the leading sector in the ECC block.

The replacement attribute determination section 238 determines whether there is an error in the sector header of a sector corresponding to a current number, by referring to an IED contained in the sector header. As described above, an IED is an error detection code provided in a sector header. Therefore, with an IED, whether there is an error in a sector header can be determined.

When the replacement attribute determination section 238 determines that there is no error in a sector header, the replacement attribute determination section 238 determines that the sector header is used to determine the defect replacement allowance attribute (S502). In this case, the process branches to (S506). When the replacement attribute determination section 238 determines that there is an error in a sector header, the replacement attribute determination section 238 determines that the sector header is not used to determine the defect replacement allowance attribute (S502). The reason is that a less reliable sector header having a detected error is prevented from being used. In this case, the process branches to (S503).

The replacement attribute determination section 238 adds one to a current sector number in order to determine whether the sector header of a subsequent sector can be used to determine the defect replacement allowance attribute (S503). If a current sector number after the addition of one becomes 16, an error is detected in all sector headers of an ECC block. In this case, the process branches to (S505).

When a current sector number is 15 or less, the process branches to (S502). Therefore, verification is continued for the sector header of a subsequent sector (S503, S504).

When the replacement attribute determination section 238 determines that there is no error in the sector header of a sector corresponding to a current sector number, the replacement attribute determination section 238 determines whether the attribute value of the defect replacement allowance attribute data of the sector is a value representing "allowed" (e.g., "0") or a value representing "forbidden" (e.g., "1") (S506).

When the attribute value of the defect replacement allowance attribute data referred to in (S506) is the value representing "allowed" (e.g., "0"), the replacement attribute determination section 238 returns a determination result indicating "allowed" to the reproduction control section 236 (S505). The process is normally ended (S508).

When the attribute value of the defect replacement allowance attribute data referred to in (S506) is the value representing "forbidden" (e.g., "1"), the replacement attribute determination section 238 returns a determination result indicating "forbidden" to the reproduction control section 236 (S507). The process is normally ended (S508).

As described above, in the defect replacement allowance attribute determination process of FIG. 5, whether there is an error in a sector header is determined by checking an IED of the sector header which is an error detection code. According to the determination, a less reliable sector header having a detected error is prevented from being used. Therefore, even when there is an error in a sector header, it is possible to determine a defect replacement allowance attribute with a high degree of reliability.

As described above, in the defect replacement allowance attribute determination process of FIG. 5, whether the sector header of a sector is used to determine the defect replacement allowance attribute is determined for sectors of an ECC block successively from the leading sector (i.e., the sectors are successively assigned, from the leading sector of an ECC block, higher precedence for the determination of defect replacement allowance attributes). Therefore, even when the recording is interrupted partway in an ECC block due to a servo error or the like, a defect replacement allowance attribute can be correctly determined.

As described above, in the defect replacement allowance attribute determination process of FIG. 5, when an error is detected in all sector headers in an ECC block, a determination result indicating "allowed" is returned. Therefore, it is possible to prevent erroneous ignorance of an error occurring in non-real-time data which requires the reliability of data.

Note that in the defect replacement allowance attribute determination process of FIG. 5, a sector to be determined is a sector in which an error is not detected using an IED, i.e., an error detection code, of the sector header of the sector. Alternatively, a sector which can be corrected using an internal code which is a correction code provided in the sector, or a sector in which an error is not detected using an EDC which an error detection code even for the user data of the sector, may be used as a sector to be determined.

Further, in the defect replacement allowance attribute determination process of FIG. 5, the sectors are sequentially assigned, from the leading sector of an ECC block, higher precedence for the determination of respective defect replacement allowance attributes. Alternatively, in a system having a low frequency of occurrence of servo errors, "allowed" or "forbidden" may be determined based on majority rule of the attributes of the defect replacement allowance attribute data contained in each sector of an ECC block.

Note that in the defect replacement allowance attribute determination process of FIG. 5, the sectors are sequentially assigned, from the leading sector of an ECC block, higher precedence for the determination of respective defect replacement allowance attributes. Alternatively, taking into account the premise that data recorded in the state that the execution of a defect replacement process is allowed can be always reproduced due to the defect replacement process, the determination "forbidden" may be returned when there is at least one sector of an ECC block in which data is recorded in the state that the execution of a defect replacement process is forbidden.

Next, a recording process in which the information recording and reproduction system 200 records non-real-time data onto the rewritable disk 250 will be described with reference to FIG. 6. Non-real-time data to be recorded onto the rewritable disk 250 is herein described as a computer program which is stored in the magnetic disk apparatus 217.

The host computer 210 reads out the computer program stored in the magnetic disk apparatus 217 and stores the program into the main memory 212. Thereafter, the host computer 210 issues a non-real-time data recording command to the disk recording and reproduction drive 230 via the I/F control card 216.

Figure 6:
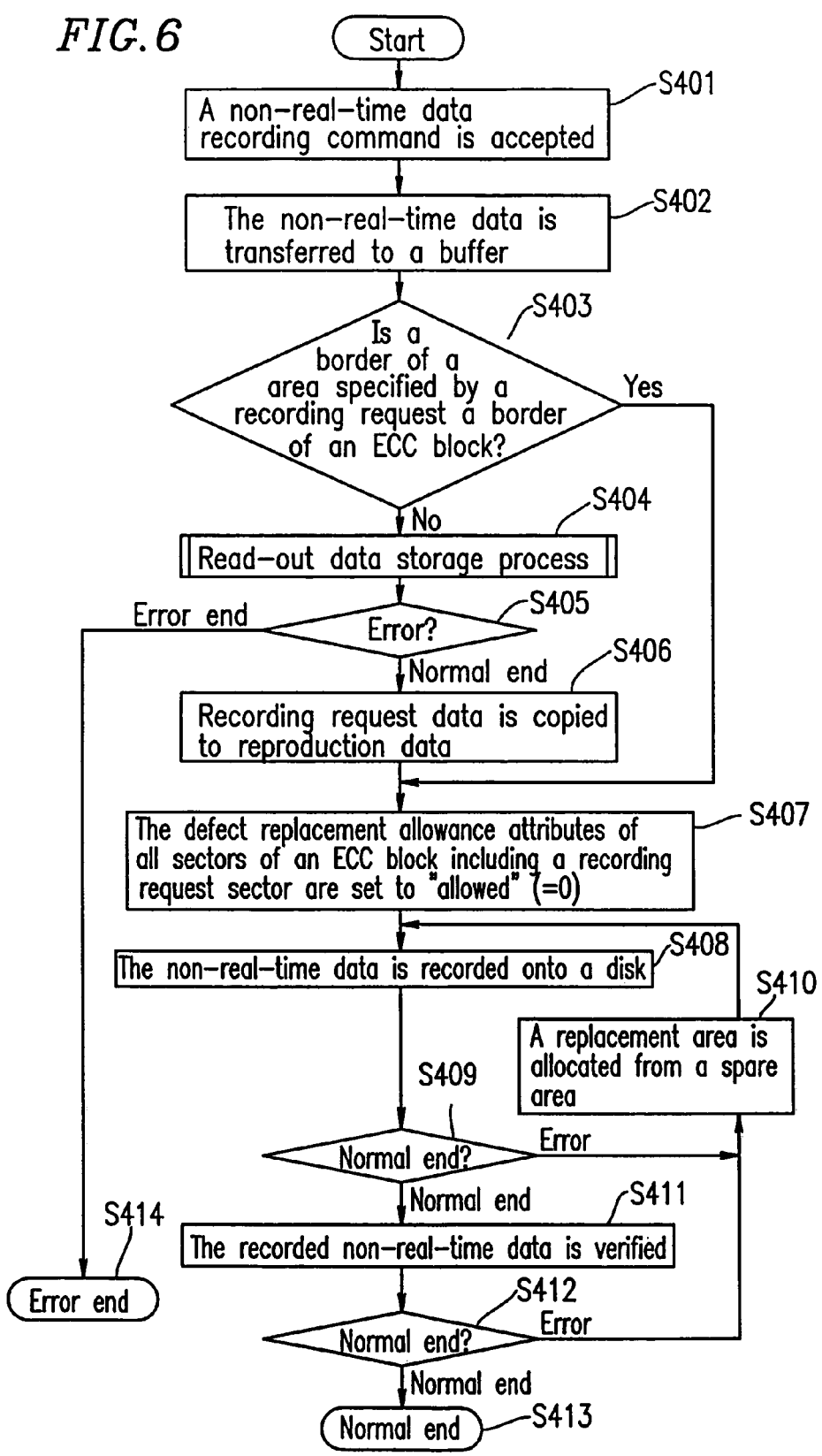
FIG. 6 is a flowchart showing a flow of a recording process in which the disk recording and reproduction drive 230 records non-real-time data onto the rewritable disk 250.

FIG. 6 is a flowchart showing a flow of a recording process in which the disk recording and reproduction drive 230 records non-real-time data onto the rewritable disk 250.

When the I/F control circuit 231 of the disk recording and reproduction drive 230 accepts the non-real-time data recording command, a data transfer section (not shown) provided in the I/F control circuit 231 is actuated so that the I/F control circuit 231 accepts non-real-time data from the host computer 210 and stores the non-real-time data into the data buffer 239 (S401, S402).

Thereafter, the I/F control circuit 231 transmits to the recording control section 232 an instruction to record the non-real-time data stored in the data buffer 239. The recording control section 232 determines whether a border of an area specified by a non-real-time data recording command (recording request) is a border of an ECC block (S403). Such a determination can be, for example, achieved by checking whether the starting position of an area specified by a recording request is a border of an ECC block (i.e., an integral multiple of 16) and whether the number of recording sectors is an integral multiple of an ECC block.

In (S403), when the determination is affirmative, the process branches to (S407) since an RMW process is not required. When the determination is negative in (S403), the process branches to (S404) since an RMW process is required.

When the recording control section 232 determines that a border of an area specified by a non-real-time data recording command (recording request) is not a border of an ECC block, a read-out process in which an ECC block including an area specified by a recording request is read out is actuated. The read-out process is the same as the read-out data storage process marked by a dashed line in FIG. 4. A description of the read-out process is here omitted.

Note that the read-out data storage process (S404) returns "error end" so long as an error is detected in reading out data and it is determined that the recording of the data has been executed in the state that the execution of a defect replacement process is allowed, and otherwise returns "normal end".

When the recording control section 232 accepts "error end" from the read-out data storage process (S404), the recording control section 232 transmits an error end report to the I/F control circuit 231 since an RMW process cannot be executed. As a result, the recording process is erroneously ended (S414).

When the recording control section 232 accepts "normal end" from the read-out data storage process (S404), the recording control section 232 instructs the buffer control section 235 to overwrite the read-out data (or 00h data) stored in the buffer memory 239 with non-real-time data to be recorded, at a predetermined position of the read-out data. The buffer control section 235 performs the overwrite process instructed by the recording control section 232, and returns a report of completion to the recording control section 232 (S406).

The recording control section 232 instructs the sector information generation section 233 to generate sector information in which the attribute value of the defect replacement allowance attribute data is set to a value representing "allowed" (e.g., "0") for all sectors in recorded data stored in the data buffer 239. The sector information generation section 233 generates predetermined sector information and provides the sector information for all sectors in an ECC block to be recorded, and thereafter transmits a report of completion to the recording control section 232 (S407).

The recording control section 232 instructs the data recording section 234 to record the non-real-time data in the data buffer 239 onto the rewritable disk 250. The data recording section 234 performs the recording process instructed by the recording control section 232 (S408), and returns a result of the recording process (normal end/error end) to the recording control section 232.

The recording control section 232 determines the result of the recording process (normal end/error end) (S409).

When the result of the recording process is determined as "error ends" in (S409), the recording control section 232 allocates an available replacement area from a spare area. Thereafter, the process goes back to (S408). The recording control section 232 instructs the data recording section 234 to record non-real-time data in the data buffer 239 into the replacement area. The data recording section 234 performs the recording process instructed by the recording control section 232.

When the result of the recording process is determined as "normal end" in (S409), the recording control section 232 instructs the data read-out section 237 to read out data in a data check mode in order to check whether the recorded data is recorded while a margin sufficient for reproduction is secured. The term "data check modes" herein means a mode in which it is checked whether reproduction is still possible even if conditions for data reproduction are intentionally caused to be worse than typical conditions.

The data read-out section 237 performs a read-out process in the data check mode in accordance with an instruction from the recording control section 232 (S411), and returns a result of the read-out process (normal end/error end) in the data check mode to the recording control section 232.

The recording control section 232 determines the result of the read-out process in the data check mode (normal end/error end) (S412).

When the result of the read-out process is determined as "error end" in (S412), the process branches to (S410).

When the result of the read-out process is determined as "normal end" in (S412), the recording control section 232 transmits a report of normal end to the I/F control circuit 231. As a result, the recording process is normally ended (S413).

As described above, according to the method for recording non-real-time data shown in FIG. 6, the attribute value of defect replacement allowance attribute data is set to a value representing "allowed" (e.g., "0") in recording non-real-time data. Therefore, when an error occurs in reproducing non-real-time data, an error process suitable for non-real-time data can be executed by referring to the attribute value of defect replacement allowance information.

As described above, according to the method for recording non-real-time data shown in FIG. 6, even when an error occurs in reading data in an RMW process, if the data has been recorded in the state that the execution of a defect replacement process is forbidden, the read-out error is ignored so that the RMW process is continued. Therefore, it is possible to prevent the RMW process from being erroneously ended.

Next, a recording process in which the information recording and reproduction system 200 records real-time data onto the rewritable disk 250 will be described with reference to FIG. 7. It is here assumed that the host computer 210 determines that data (video or audio data) input via the AV data encoding card 219 is real-time data.

Further, when the host computer 210 records real-time data onto the rewritable disk 250, the host computer 210 issues to the disk recording and reproduction drive 230 a recording command (real-time data recording command) which is different from a recording command used in recording non-real-time data onto the rewritable disk 250.

Further it is assumed that a border of an area specified by a real-time data recording command is a border of an ECC block. The reason is that taking into account that the size of real-time data is large and that a delay required for an RMW process is likely to hinder a real-time process, an RMW process is prevented from occurring in recording real-time data.

The central processing circuit 211 of the host computer 210 actuates the AV data encoding card 219, and starts acceptance of the real-time data. Thereafter, the host computer 210 issues a real-time data recording command to the disk recording and reproduction drive 230 via the I/F control card 216.

Figure 7:
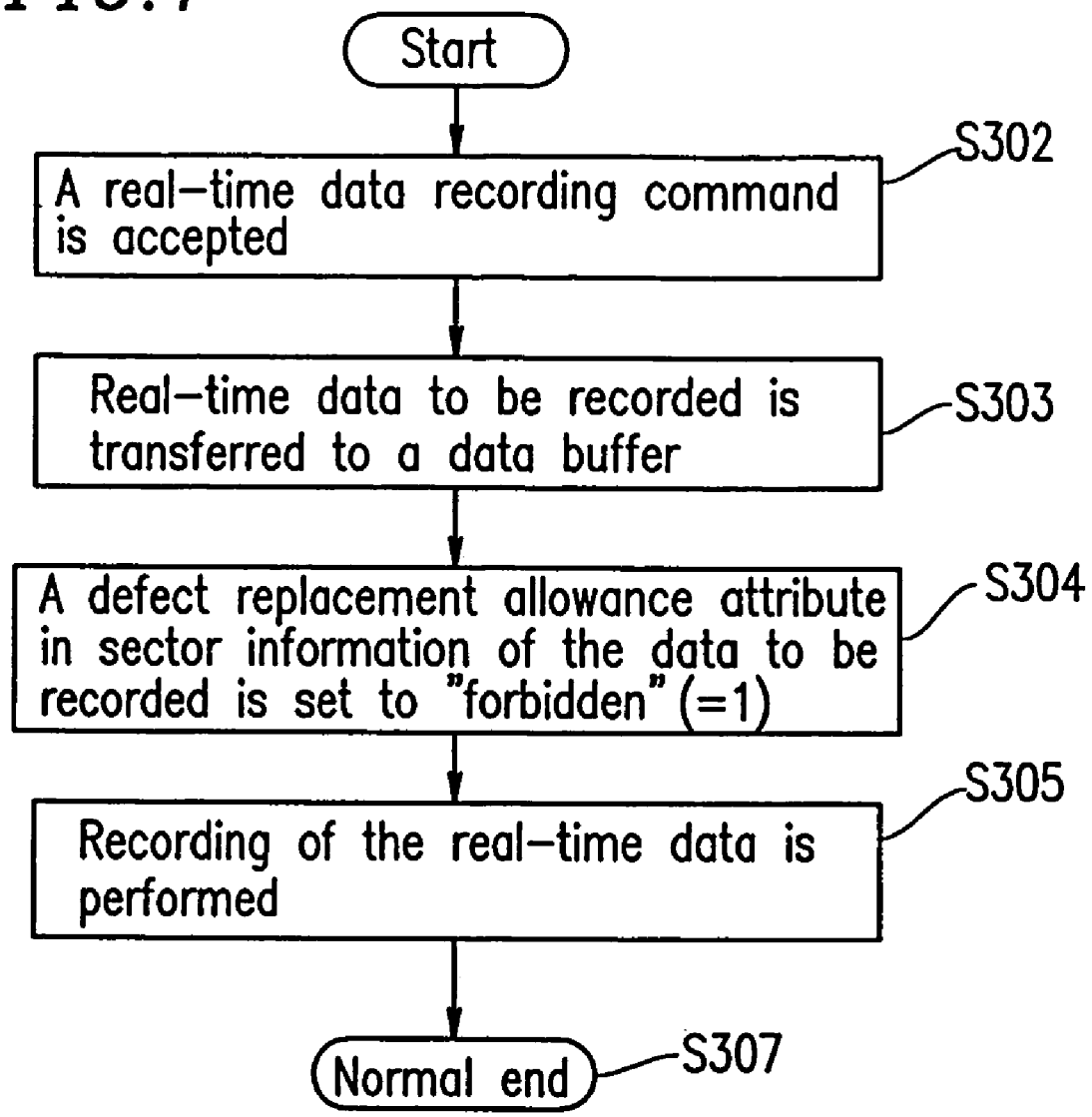
FIG. 7is a flowchart showing a flow of a recording process in which the disk recording and reproduction drive 230 records real-time data onto the rewritable disk 250.

FIG. 7 is a flowchart showing a flow of recording real-time data onto the rewritable disk 250.

When the I/F control circuit 231 of the disk recording and reproduction drive 230 accepts a real-time data recording request command, a data transfer section (not shown) provided in the I/F control circuit 231 is actuated so that the I/F control circuit 231 accepts the real-time data via the device I/F bus 201 from the host computer 210 and stores the real-time data into the data buffer 239 (S302, S303). The I/F control circuit 231 transmits a recording request to the recording control section 232 so that the real-time data is recorded onto the rewritable disk 250.

When the recording control section 232 accepts the recording request of the real-time data, the recording control section 232 transmits, before recording the real-time data, a request to the sector information generation section 233 so that the sector information of data to be recorded which is stored in the data buffer 239 is generated. In this case, since the data to be recorded is real-time data, the sector information generation section 233 sets the attribute value of defect replacement allowance attribute data in sector information to a value representing "forbidden" (e.g., "1") for all sectors in which the real-time data will be recorded (S304).

After the recording control section 232 accepts an acknowledgement of completion of the generating of the sector information from the sector information generation section 233, the recording control section 232 instructs the data recording section 234 to record the real-time data in the data buffer 239 onto the rewritable disk 250 at a specified position thereof.

The data recording section 234 performs a recording process in accordance with a command from the recording control section 232 (S305). After completion of the recording process, the data recording section 234 returns a report of completion of recording and a result of the recording process (normal end/error end) to the recording control section 232. When the recording control section 232 accepts the report of completion of recording, the recording control section 232 determines that the recording is completed, irrespective of a result of the recording process, and reports the normal end to the I/F control circuit 231. The reason the recording control section 231 ignores the result of the recording process (normal end/error end) is that a defect replacement process is restrained so that the real-time data can be recorded in real-time.

The I/F control circuit 231 reports an end to the host computer 210 via the device I/F bus 201.

When the host computer 210 accepts the report of completion of recording, the host computer 210 determines whether there is a request of stopping the recording of the real-time data. When it is determined that there is the recording stop request, the recording process is stopped. When it is determined that there is not the recording stop request, the recording is continued for subsequent real-time data.

As described above, according to the method for recording real-time data shown in FIG. 7, the attribute value of defect replacement allowance attribute data is set to a value representing "forbidden" (e.g., "1") in recording real-time data. Therefore, when an error occurs in reproducing real-time data, the attribute value of the defect replacement allowance information is referred so that an error process suitable for real-time data can be executed.

Note that in the method for recording real-time data of Example 3, an error occurring in recording real-time data is ignored. However, a method for handling an error occurring in recording real-time data is not limited to this. As an alternative method for handling an error occurring in recording real-time data, any method which does not perform a defect replacement process in which a defective area in a user area is replaced with a replacement area in a spare area, can be adopted. A recording method in which a defective area is skipped (disclosed in Japanese Laid-open Publication No. 10-516372) may be adopted.

EXAMPLE 4

Figure 12:
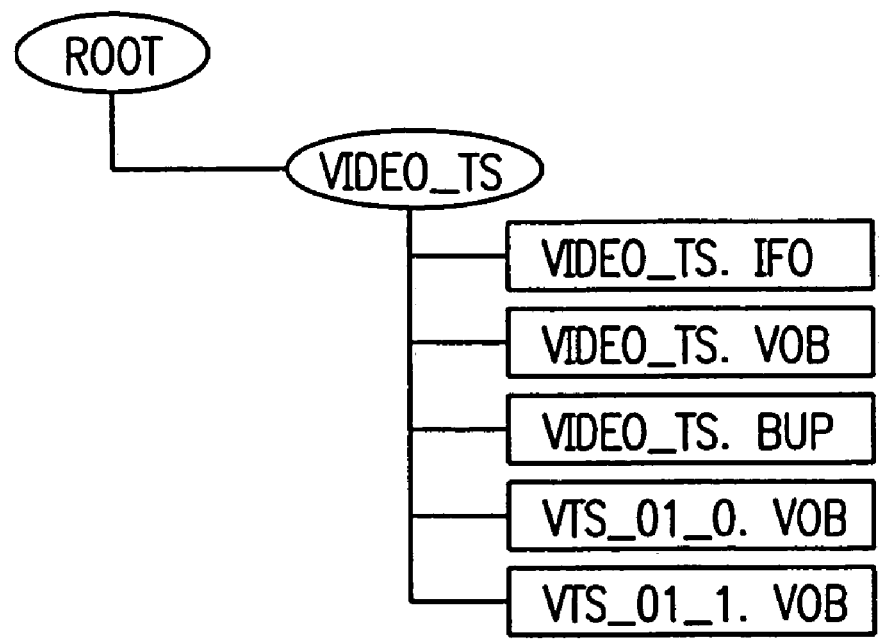
FIG. 12 is a diagram used for explaining a data structure of file management information in a DVD-Video format.
Figure 13:
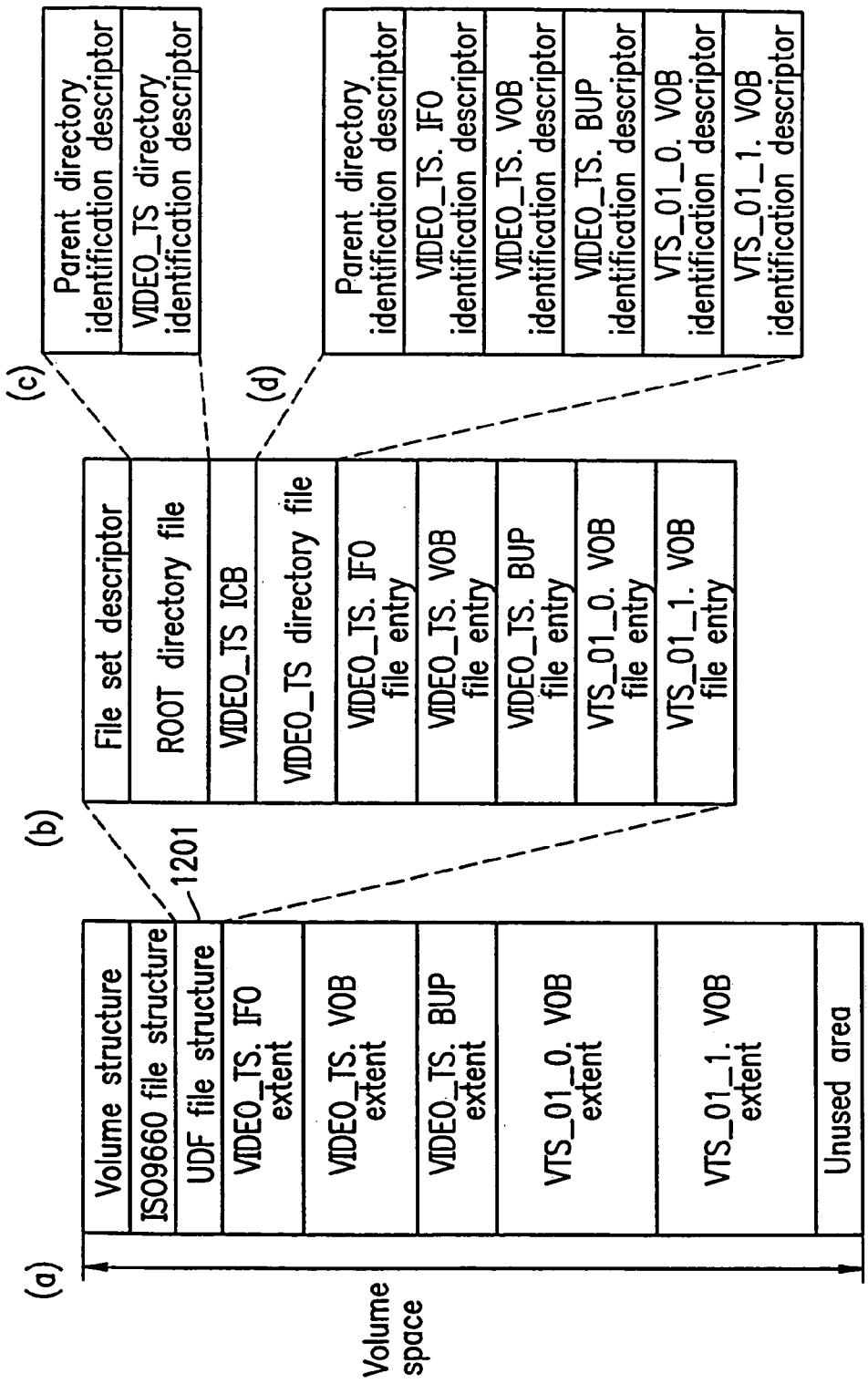
FIG. 13 is a diagram showing a data structure of the DVD-Video format.

FIGS. 12 and 13 show a data structure of a DVD-Video format which is used for a medium for distributing video and audio data. Information recorded on a DVD-Video disk is managed as files. Files are managed using a hierarchy of directories.

FIG. 12 shows an exemplary directory-file structure. In the DVD-Video format, there is a directory "VIDEO_TS" for storing video and audio data under a directory "ROOT".

In the directory "VIDEO_TS", there are five files, i.e., "VIDEO_TS.IFO", "VIDEO_TS.VOB", "VIDEO_TS.BUP", "VIS_01_0.VOB", and "VTS_01_0.VOB".

In the "VIDEO_TS.IFO" file, control information for controlling video and audio data is stored.

In the "VIDEO_TS.VOB" file, a menu video which is used to select one title to be reproduced, from a plurality of titles, is stored.

The "VIDEO_TS.BUP" file is a backup file in which the same content as information stored in the "VIDEO_TS.IFO" file is stored. This backup file is used when the "VIDEO_TS.IFO" file cannot be reproduced due to a contamination or the like.

The "VTS_01_0.VOB" file and the "VTS_01_1.VOB" file each indicate a title containing video and audio data.

Portion (a) of FIG. 13 shows a data structure of the logic space of a disk in which the directories and files of FIG. 12 are recorded. Control information, such as the size of an available space on a disk, is defined by a volume structure.

In a DVD-Video disk, a directory and a file are managed using two types of directory-file structures. One of the two types is an ISO9660 file structure. The other is a UDF file structure. These file structures have different data structures, but have a content having the same meaning.

Hereinafter, the UDF file structure will be described (portion (b) of FIG. 13).

A file set descriptor contains "ROOT ICB" (not shown) which is positional information for a "ROOT directory file" which is information on the "ROOT" directory.

In the "ROOT directory file", a parent directory identification descriptor indicating positional information of an upper directory, and a VIDEO_TS directory identification descriptor in which positional information of "VIDEO_TS ICB" indicating positional information about the "VIDEO_TS" directory, are stored (portion (c) of FIG. 13).

In the "VIDEO_TS ICB", positional information of the "VIDEO_TS directory file" in which information on the "VIDEO_TS" directory is stored, is stored.

In the "VIDEO_TS directory file", a parent directory identification descriptor indicating positional information of an upper directory, and a file identification descriptor which is positional information for each file entry indicating positional information of a file stored in the "VIDEO_TS" directory, are recorded for each file (portion (b) of FIG. 13).

In the file entry of each file, positional and size information of an extent in which user data of the file is stored, is recorded. Therefore, when one file in the "VIDEO_TS" directory is accessed, information is obtained from the "ROOT" directory, the "VIDEO_TS" directory, the file entry, and the file extent" in this order, thereby enabling access to the file.

The data structure of the DVD-Video format is characterized in that the directory designated "VIDEO_TS" is provided under the "ROOT" directory, and the file designated "VIDEO_TS.IFO" is provided under the "VIDEO_TS" directory. Therefore, a reproduction apparatus for reproducing a disk in which video and audio data is recorded in the DVD-Video format, can determine whether video and audio data are recorded on a disk in the DVD-Video format, by interpreting an UDF file structure or an IS09660 file structure and detecting whether there is a "ROOT" directory, a VIDEO_TS" directory, and a "VIDEO_TS.IFO" file.

Next, a flow of a reproduction process for reproducing video and audio data recorded in the DVD-Video format of FIGS. 12 and 13, will be described. The reproduction process of the present invention includes a function of detecting copyrighted contents illegally copied on a recordable disk from a reproduction-only disk in which the contents are recorded, and forbidding reproduction of the contents illegally copied (i.e., a copyright protection function).

A reproduction apparatus for performing a reproduction process having such a copyright protection function has a structure similar to that of the information recording and reproduction system 200 of FIG. 3. Therefore, a description of the structure of the reproduction apparatus is omitted. Note that in Example 4, a disk 250 to be reproduced by the reproduction apparatus is either a reproduction-only disk or a recordable disk (rewritable disk).

Figure 14:
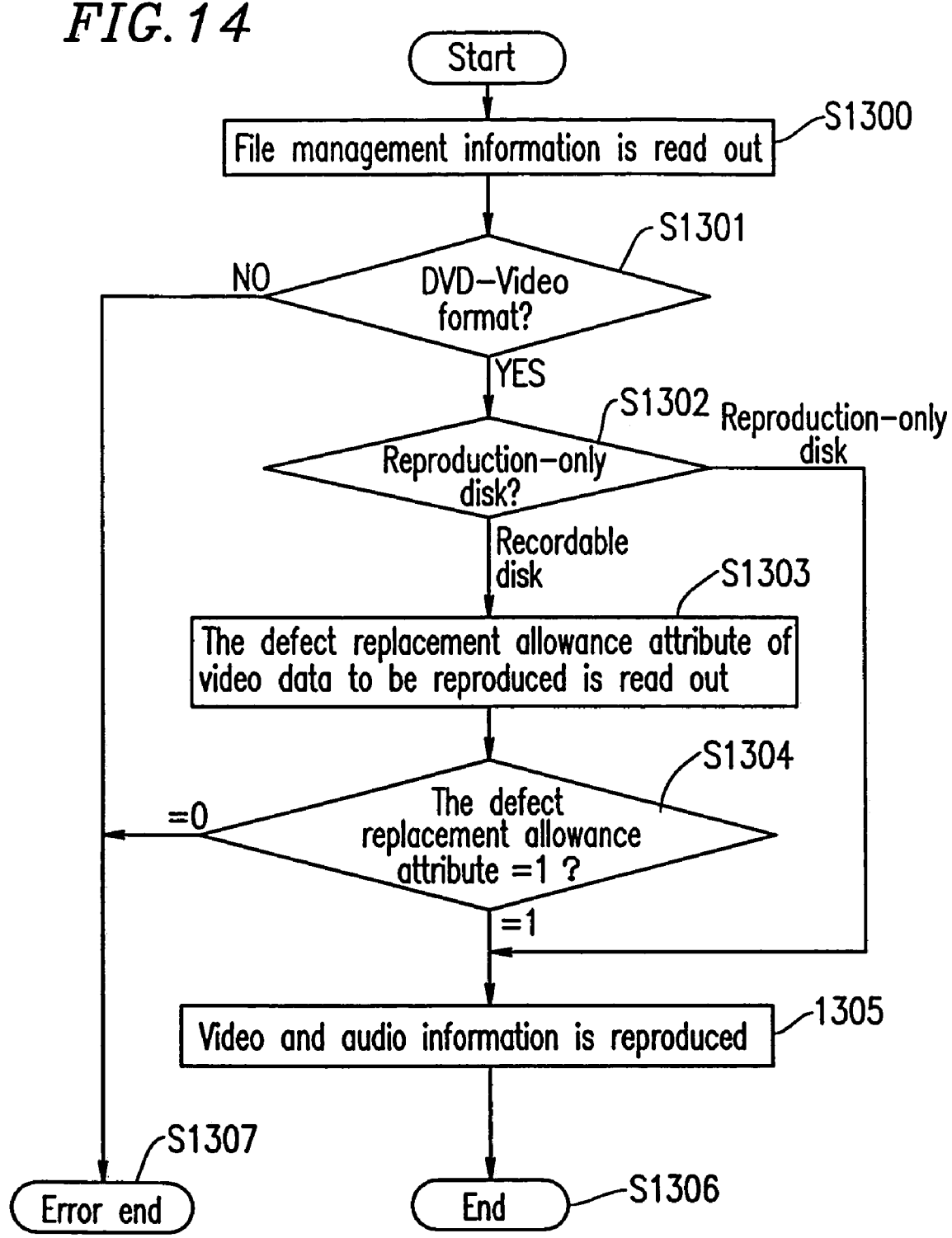
FIG. 14 is a flowchart showing a flow of a reproduction process according to the present invention.

FIG. 14 is a flowchart showing a flow of a reproduction process having the copyright protection function. Hereinafter, each of the steps of the reproduction process will be described with reference to FIGS. 3, 12 and 13.

A video and audio data reproduction program (not shown) stored in the main memory 212 of the host computer 210 issues, before reproducing video and audio data, to the disk recording and reproduction drive 230 a read-out command to read out file management information (the UDF file structure 1201) recorded on the disk 250.

When the I/F control circuit 231 of the disk recording and reproduction drive 230 accepts the read-out command, the I/F control circuit 231 transmits an instruction to the reproduction control section 236. The reproduction control section 236 reads out the UDF file structure 1201 recorded on the disk 250 by controlling the data read-out section 237, and temporarily stores the read-out UDF file structure 1201 in the data buffer 239. Thereafter, the read-out UDF file structure 1201 is stored into the main memory 212 of the host computer 210 via the I/F control circuit 231 (S1300).

Thereafter, the video and audio reproduction program interprets the UDF file structure 1201 stored in the main memory 212, and determines whether the format of video and audio data recorded on the disk 250 is the DVD-Video format (S1301). As a result of the interpretation of the UDF file structure 1201, when it is found that there is a "VIDEO_TS" directory under a "ROOT" directory and there is a "VIDEO_TS.IFO" file in the VIDEO_TS" directory, it is determined that the format of the video and audio data recorded in the disk 250 is the DVD-Video format. Otherwise, it is determined that the format of the video and audio data recorded in the disk 250 is not the DVD-Video format. In this case, the reproduction process is erroneously ended (S1307).

In (S1301), when it is determined that the format of the video and audio data recorded in the disk 250 is the DVD-Video format, the video and audio data reproduction program issues to the disk recording and reproduction drive 230 a command to inquire whether the disk 250 is a recordable disk or a reproduction-only disk.

The disk recording and reproduction drive 230 detects a physical property, such as a reflectance, of the disk 250 by controlling the data read-out section 237, and based on a result of the detection, determines whether the disk 250 is a reproduction-only disk, and returns a result of the determination to the host computer 210 (S1302). If it is determined that the disk 250 is a recordable disk, the reproduction process goes to (S1303).

If it is determined that the disk 250 is a reproduction-only disk, video and audio data recorded on the disk 250 is reproduced (S1305). The reason is that when the disk 250 is a reproduction-only disk, there is not a possibility that data to be reproduced is illegally copied data.

In (S1302), when it is determined that the disk 250 is a recordable disk, the video and audio, reproduction program issues a command which instructs the disk recording and reproduction drive 230 to read out the defect replacement allowance attribute data of a sector in which the video and audio data is recorded on the disk 250, in order to check whether the video and audio data is illegally copied data from a reproduction-only disk.

When the disk recording and reproduction drive 230 accepts the command from the video and audio reproduction program, the disk recording and reproduction drive 230 controls the data read-out section 237 so that the sector header information of a sector specified by the command is read out, and transmits the read-out sector header information to the host computer 210. Alternatively, the defect replacement allowance attribute data of the sector specified by the command may be read out, and the read-out defect replacement allowance attribute data may be transferred to the host computer 210 (S1303).

The command from the video and audio reproduction program determines whether the attribute value of defect replacement allowance attribute data is a value representing "allowed" (e.g., "0") or a value representing "forbidden" (e.g., "1") (S1304).

When data recorded in a reproduction-only disk is copied to a recordable disk by an apparatus, such as a personal computer, the attribute value of the defect replacement allowance attribute data of a sector in which the data is recorded is set to the value representing "allowed" (e.g., "0"). The reason is that the data has been recorded in the state that the execution of a defect replacement process is allowed.

On the other hand, when data input from an apparatus, such as a camera connected to the AV encoding card 219 of the host computer 210, is recorded onto the disk 250 in real-time, the attribute value of the defect replacement allowance attribute data of a sector in which the data is recorded is set to the value representing "forbidden" (e.g., "1"). The reason is that the data input from an apparatus, such as a camera, is recorded onto the disk 250 as real-time data. Such a recording process is executed in accordance with the process shown in FIG. 7, for example.

In (S1304), when it is determined that the attribute value of the defect replacement allowance attribute data is the value representing "allowed" (e.g., "0"), it is determined that the video and audio data recorded in the disk 250 is illegally copied data from a reproduction-only disk. In this case, the reproduction process is erroneously ended (S1307).

In (S1304), when it is determined that the attribute value of the defect replacement allowance attribute data is the value representing "forbidden" (e.g., "1"), it is determined that the video and audio data recorded in the disk 250 is data which is originally recorded by a user. In this case, the video and audio data recorded in the disk 250 is reproduced (S1305).

Note that the flow of the reproduction process of video and audio data in (S1305) is similar to the flow of the reproduction process shown in FIG. 4. Therefore, a description of the flow in (S1305) is omitted.

The video and audio reproduction program issues a data read-out command to the disk recording and reproduction drive 230 until the reproduction of all video and audio data recorded in the disk 250 is completed. When the reproduction of all video and audio data recorded in the disk 250 is completed, the reproduction process is ended (S1306).

Note that in Example 4, the presence or absence of the three files, i.e., the "ROOT" directory, the "VIDEO_TS" directory, and the "VIDEO_TS.IFO", is detected in order to identify the DVD-Video format. The process of identifying the DVD-Video format may be simplified. For example, the presence or absence of only one file, i.e., the "VIDEO_TS"

directory, may be detected. Alternatively, the process of identifying the DVD-Video format may be more stringent. For example, in addition to the detection of the presence or absence of the above-described three files, the content of the "VIDEO_TS.IFO" file may be checked.

Note that the control information recorded on the disk 250 may be used in order to determine whether the disk 250 is a reproduction-only disk.

Further, in Example 4, the determination of the attribute value of defect replacement allowance attribute data is executed for a single sector before the reproduction of video and audio data. Needless to say, the determination of the attribute value of the defect replacement allowance attribute data may be executed for all sectors in parallel to the reproduction process of video and audio data.

Further, in Example 4, the reproduction process shown in FIG. 14 includes the step of determining whether the disk 250 is a reproduction-only disk (S1302). However, when the attribute value of the defect replacement allowance attribute data is always set to the value representing "forbidden" (e.g., "1"), it is needless to say that step (S1302) shown in FIG. 14 can be omitted. When step (S1302) shown in FIG. 14 is omitted, if a determination result in step (S1301) is "Yes", the reproduction process may go to step (S1303).

According to the reproduction method of Example 4, when copyrighted contents recorded in a reproduction-only disk are illegally copied to a recordable disk, reproduction of the illegally copied contents to the recordable disk can be forbidden. Therefore, the copyright can be protected.

Note that in the above-described Examples, the information reproduction method and the information recording method are applied to the information recording and reproduction system including a host computer and a disk recording and reproduction drive. Needless to say, the information recording and reproduction system may be a DVD recorder in which a host computer and a disk recording and reproduction drive are integrated.

According to the information recording medium of the present invention, each sector is provided with an attribute data area for recording defect replacement allowance attribute data indicating whether the recording of data into the information recording medium has been executed in the state that the execution of a defect replacement process is allowed. This makes it possible to record the defect replacement allowance attribute data in the information recording medium. As a result, the reproduction apparatus can execute a recovery process in which when an error occurs in reading a sector in which data has been recorded in the state that the execution of a defect replacement process is not allowed, (e.g., data padding area other than an area of the ECC block which is requested for recording.

According to the information reproduction method of the present invention, when an error occurs in reading out data, it is determined whether the data has been recorded in the state that the execution of a defect replacement process is forbidden. When the data has been recorded in the state that the execution of a defect replacement process is forbidden, the read-out error of the data is ignored and the reproduction process is continued. Therefore, an error is not returned in response to a command to read out data which has been recorded in a defective area due to the state that the execution of a defect replacement process is forbidden in recording the real-time data.

According to the information reproduction method of the present invention, when an error occurs in reproduction, reproduced data is replaced with predetermined data (00h in the above-described Examples). Therefore, when 00h is returned in reproduction of video data or the like, a recovery process can be realized in which video data is interpolated based on video data before and after that video data.

According to the information recording method of the present invention, a defect replacement allowance attribute is set to "forbidden" in recording real-time data, while a defect replacement allowance attribute is set to "allowed" in recording non-real-time data. By referring to the defect replacement allowance information, when an error occurs in a reproduction process, a frequency of occurrence of errors in reproduction can be significantly reduced.

According to the information recording method of the present invention, in an RMW process executed in recording non-real-time data, even when an error occurs in data read-out process, if the data has been recorded in a state that the execution of the defect replacement process is forbidden, the read-out process is continued. As a result, the occurrence of an error is prevented in the RMW process.

According to the information reproduction method of the present invention, when copyrighted contents recorded in a reproduction-only disk is illegally copied to a recordable disk, reproduction of the illegally copied contents to the recordable disk can be forbidden. Therefore, the copyright can be protected.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for determining whether reproduction of data recorded in an information recording medium is allowed, wherein the information recording medium including a user area, and a spare area including a replacement area, wherein the replacement area may be used instead of a defective area in the user area, wherein the user area and the spare area include a plurality of sectors, the method comprising the steps:

determining whether a format of data recorded in the information recording medium is a predetermined format; and determining whether reproduction of data recorded in the information recording medium is allowed, in accordance with an attribute value of the read-out defect replacement allowance attribute data, and the defect replacement allowance attribute data indicates whether recording of the data has been executed in a state that the execution of a defect replacement process is allowed, wherein the defect replacement process, the defective area in the user area is replaced with the replacement area in the spare area, wherein defect replacement allowance attribute data is read-out from the sector, the data being recorded in the sector, when it is determined that the format of data recorded in the information recording medium is the predetermined format, wherein the predetermined format is DVD-Video format.

* * * * *